Jan. 17, 1956  A. BÜCHI  2,730,861
MEANS FOR CHARGING AND SCAVENGING
INTERNAL COMBUSTION ENGINES
Filed Sept. 21, 1949  11 Sheets-Sheet 2

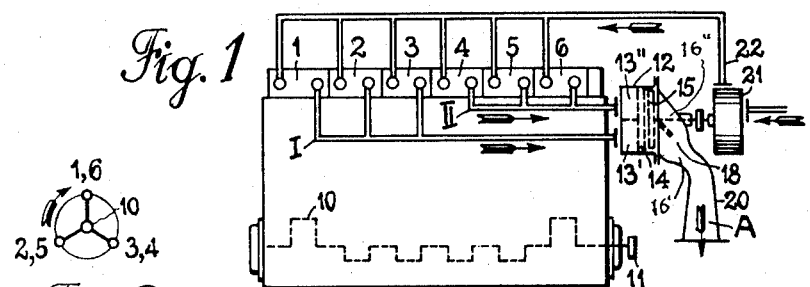
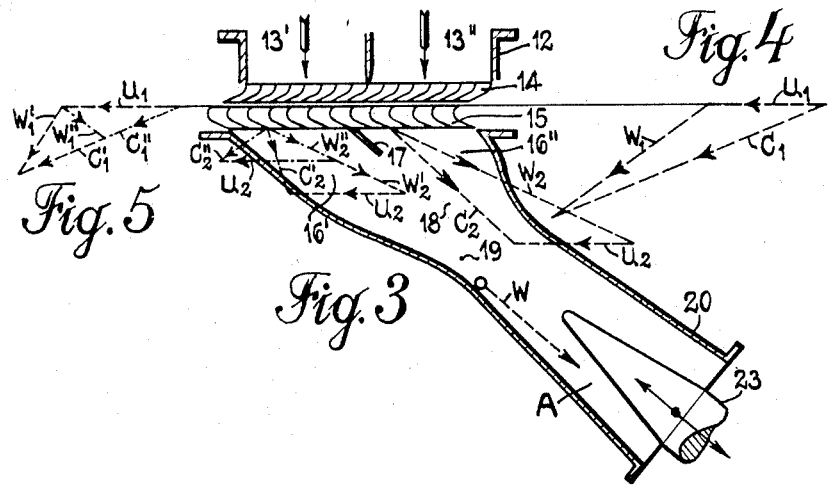
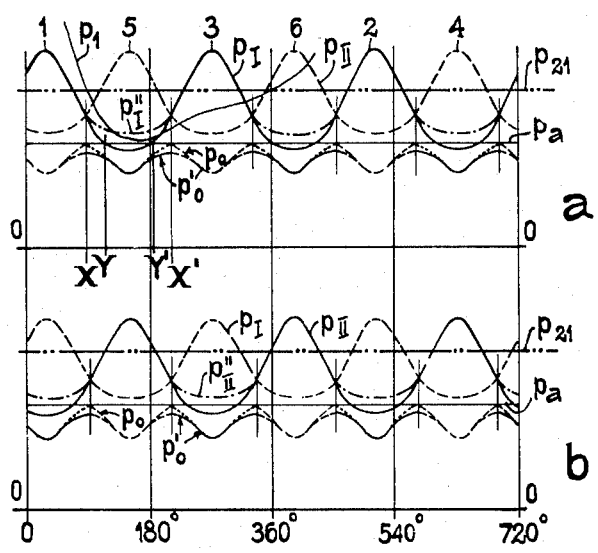

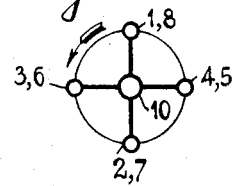
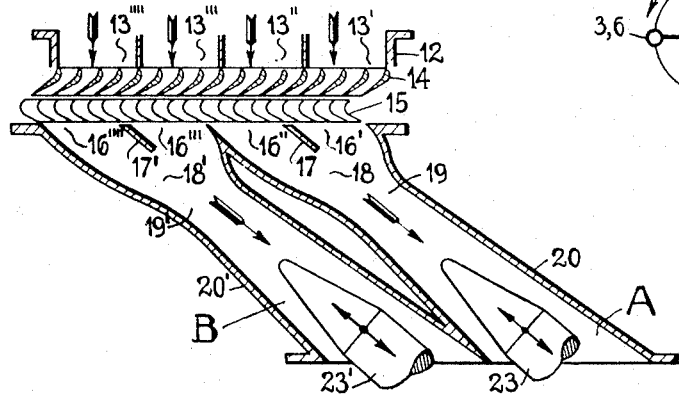
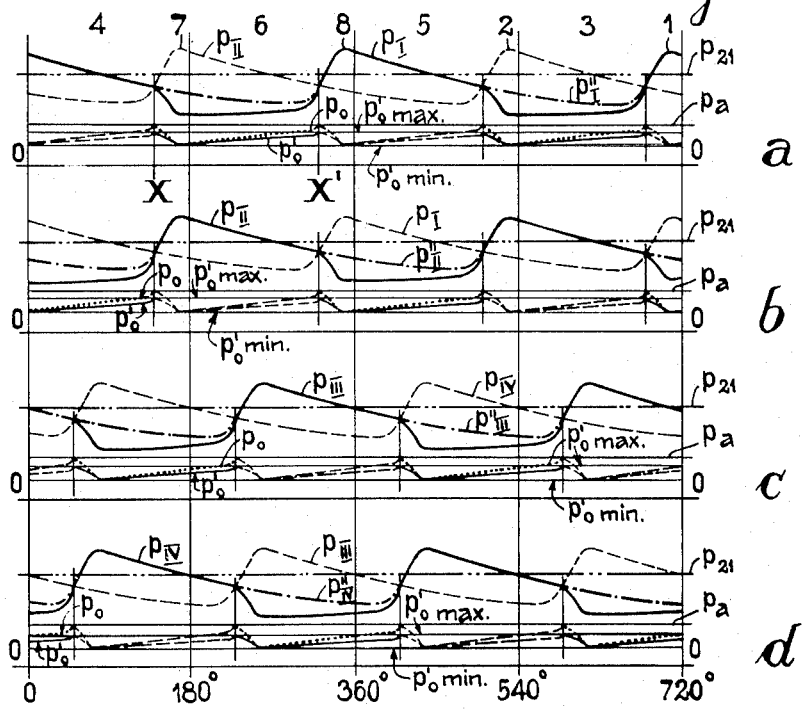

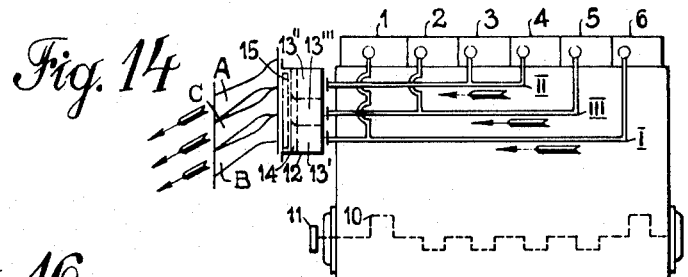
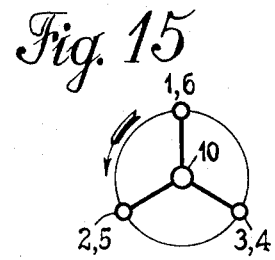
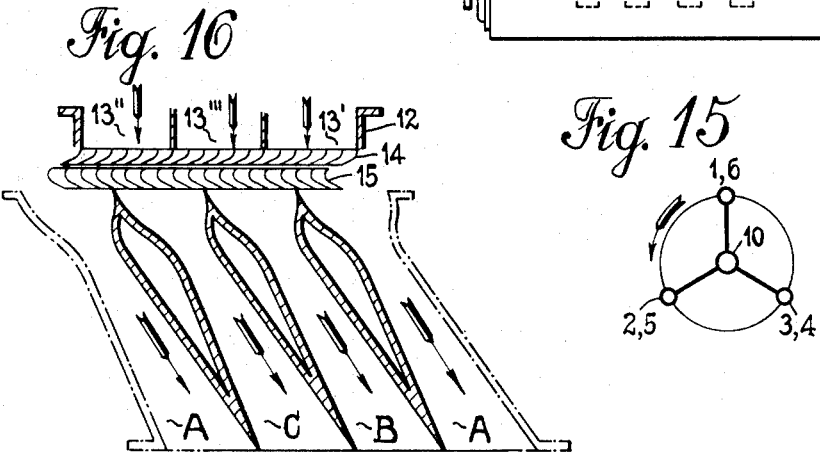
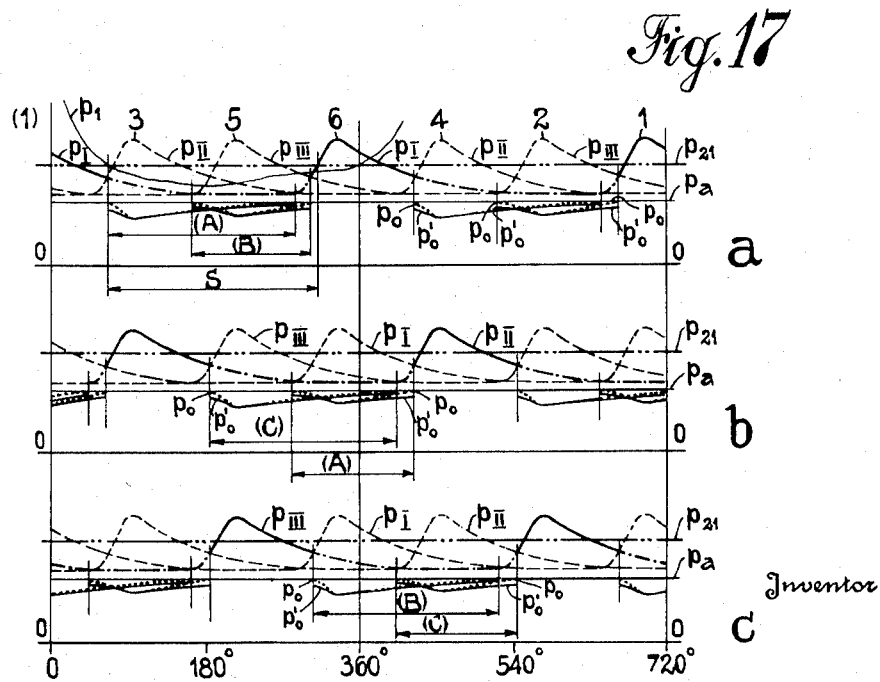

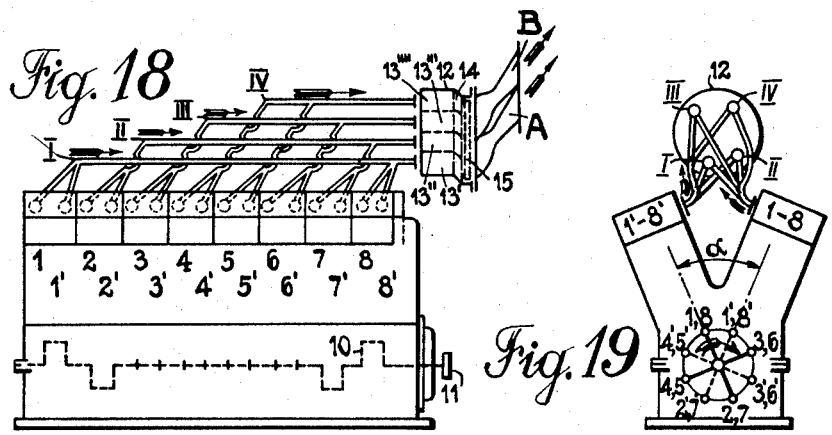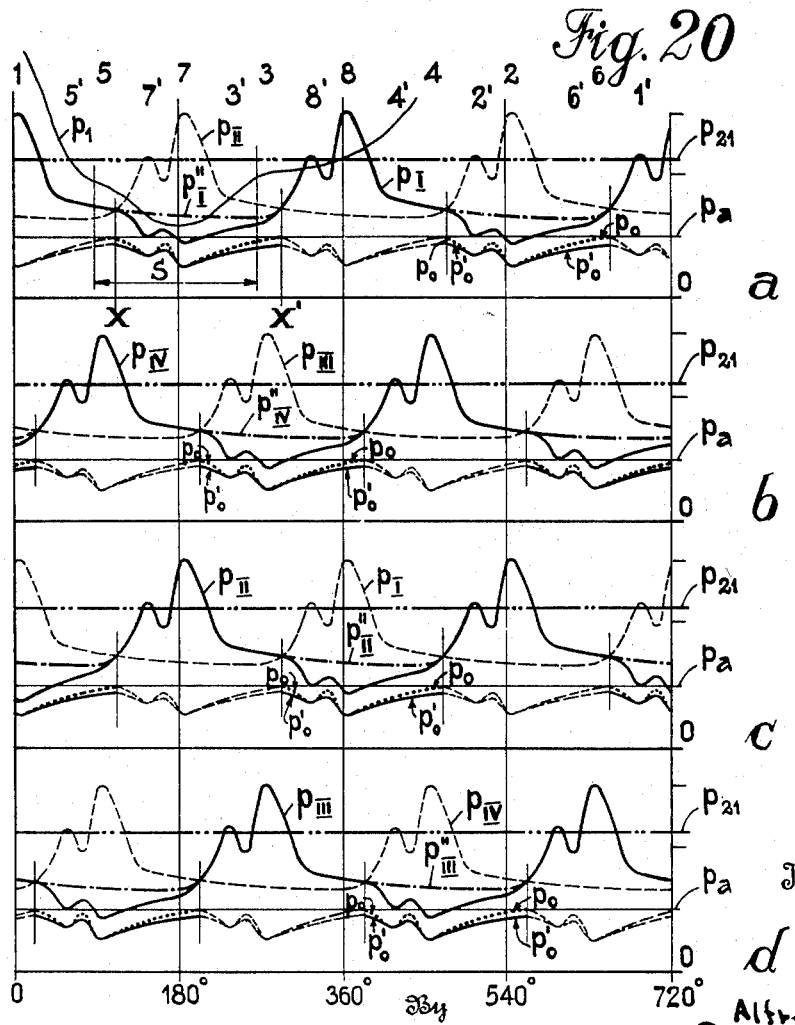

Jan. 17, 1956 — A. BÜCHI — 2,730,861
MEANS FOR CHARGING AND SCAVENGING
INTERNAL COMBUSTION ENGINES
Filed Sept. 21, 1949 — 11 Sheets-Sheet 6

Inventor
Alfred Büchi
By Richard (signature)
Attorney

Jan. 17, 1956　A. BÜCHI　2,730,861
MEANS FOR CHARGING AND SCAVENGING
INTERNAL COMBUSTION ENGINES
Filed Sept. 21, 1949　11 Sheets-Sheet 7

Inventor
Alfred Büchi
By Richard Whiting
Attorney

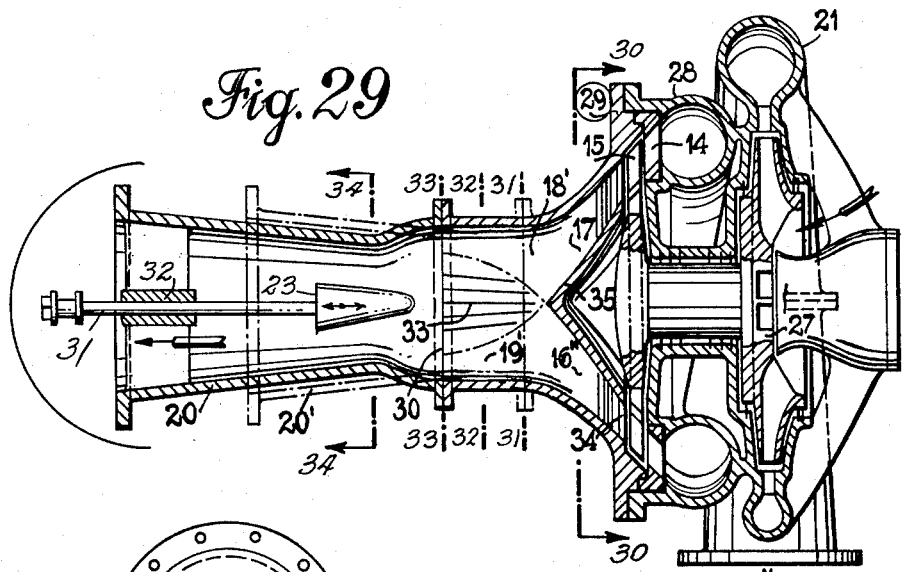
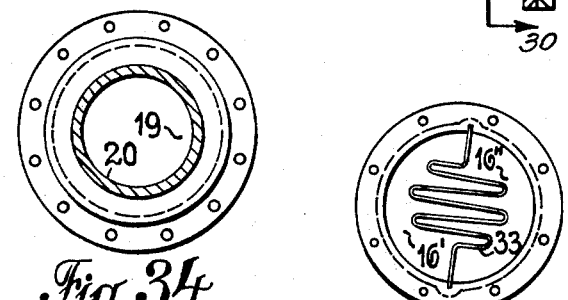
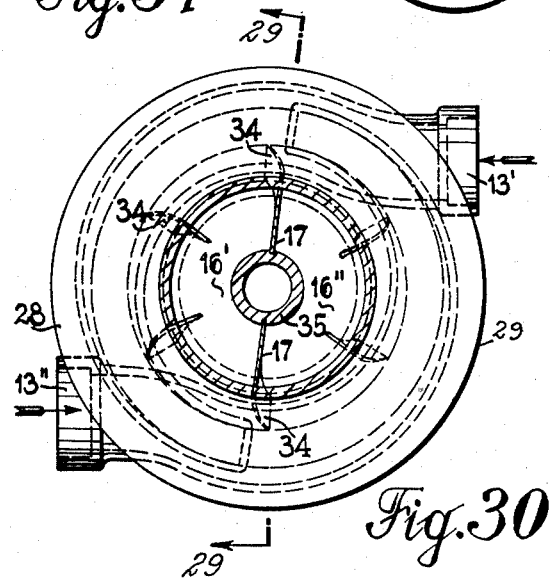
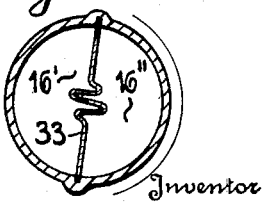

Jan. 17, 1956  A. BÜCHI  2,730,861
MEANS FOR CHARGING AND SCAVENGING
INTERNAL COMBUSTION ENGINES
Filed Sept. 21, 1949  11 Sheets-Sheet 10

Alfred Büchi
by Richard Whiting
Attorney

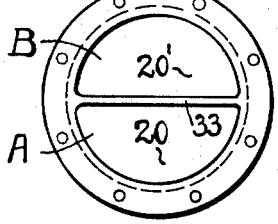
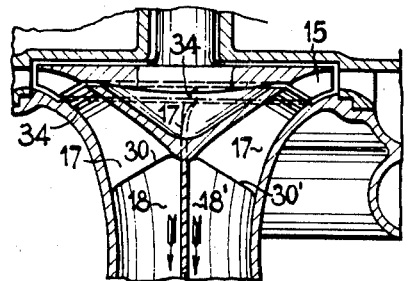
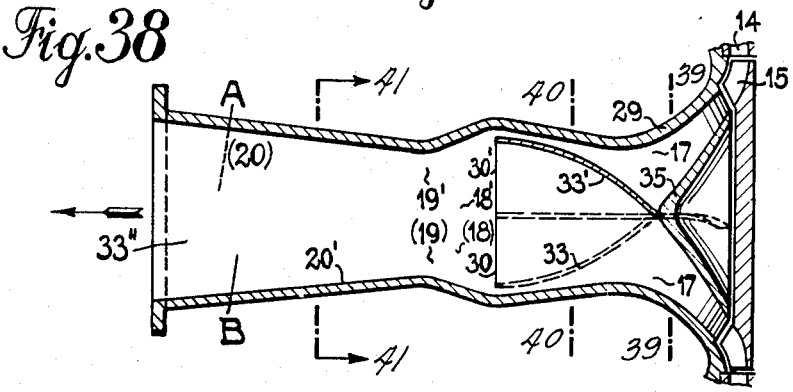
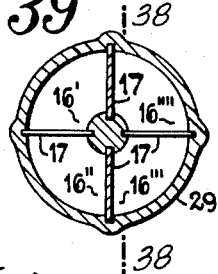
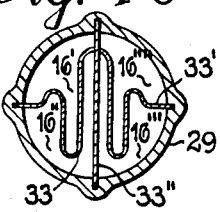
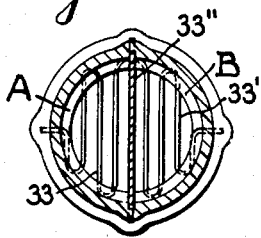

United States Patent Office 2,730,861
Patented Jan. 17, 1956

2,730,861

MEANS FOR CHARGING AND SCAVENGING INTERNAL COMBUSTION ENGINES

Alfred Büchi, Winterthur, Switzerland

Application September 21, 1949, Serial No. 116,906

Claims priority, application Switzerland September 25, 1948

68 Claims. (Cl. 60—13)

This invention relates to an improved apparatus for charging and scavenging multicylinder internal combustion engines by blowers driven by turbines which have, as their power source, the exhaust gases of the engine, employing a system similar, for example, to that disclosed by my prior U. S. Patent 1,895,538, granted January 31, 1933.

A fundamental object of my invention is to utilize, in a novel way, the differences in the varying pressure and kinetic energy in the gases exhausting at a particular time from more than one cylinder of the engine to decrease, at least at certain moments, the pressure and increase the velocity of the gases downstream of the turbine rotor. In accordance with the preferred embodiment of my invention I provide separated compartments communicating with the inlet side of the turbine rotor separately connected by manifolding with the exhaust outlets of predetermined cylinders or groups of cylinders selected to deliver exhaust surges to the several compartments in such a manner that at certain moments a higher pressure and/or kinetic energy will occur in one compartment simultaneously with a lower pressure and/or lower kinetic energy in another compartment.

An object of the present invention is to provide a system of supercharging and scavenging multi-cylinder internal combustion engines by means of blowers driven by an exhaust-gas turbine in which the exhaust gases of the cylinders are conducted in at least two exhaust gas conduits separately to said turbine in such manner that at least at the beginning of the exhaust-period of each cylinder, pressure-surges are produced upstream of the turbine and, subsequent thereto, a pressure lower than the pressure for the purpose of supercharging or scavenging the cylinders is created, wherein at least a portion of the exhaust gases of at least two cylinders, firing at different times, simultaneously deliver alternately varying amounts of energy separately through different segments of the turbine-blading and into at least one common ejector-like means disposed downstream of the turbine in such manner that the gases alternately arriving in the said ejector-like means under higher energy produce a sub-pressure, relatively to the outside pressure, downstream of the turbine rotor-blading on being mixed in a mixing part of the means with the exhaust gases alternately arriving in the said means with a smaller energy, such sub-pressure affording a greater mass-flow of air or gas respectively from the said blower through the cylinders for the purpose of intensifying the scavenging and super-charging operations of the engine and to increase the power-output of the turbine.

A further object is to provide means for supercharging and scavenging multi-cylinder internal combustion engines by blowers operated by an exhaust-driven turbine, wherein behind separate segments of the turbine blading at least one ejector-like means is disposed into which ejector-like means at least two cylinders each deliver their exhaust gases, according to a relation between time and variable energy, through separate segments of the turbine blading into at least one mixing-part, in such manner that the gases entering the latter at a higher energy level produce a sub-pressure on being mixed with the gases entering at a lower energy level, whereby the mass-flow of air and/or gas entering the respective turbine-section from the blower via the engine is increased, for intensifying the scavenging and supercharging process of the engine and to increase the power-output of the turbine and the engine.

The invention and its mode of operation are shown in various examples in the accompanying drawings.

In these drawings, with the same numbers or letters the same or similar parts of the engines or the one or other operating condition are designated. For illustrating the engines or engine parts a schematical design manner is partly chosen. The dimensions, the pressure conditions, etc., are not always accurately shown in proportion to its real dimensions or values, but so distinctly illustrated that the kind of operation of the invention and its structure can be easily understood.

Figs. 1–6 show the invention and its mode of operation embodied in a six-cylinder four-stroke internal combustion engine having two separate exhaust lines between the engine and turbine and two separate inlets into the latter, viz—

Figure 1 is a schematic side view of the engine;

Figure 2 is a diagrammatic view showing the crank positions;

Figure 3 is a partial sectional and partial diagrammatic view showing the turbine blading and the ejector-like means on a larger scale and in development, together with the gas velocity triangles at the turbine rotor outlet;

Figures 4 and 5 are diagrammatic views showing the gas velocity triangles at the turbine rotor inlet in comparison with the triangles of an engine not equipped in accord with the present invention;

Figure 6 is a diagrammatic view showing the absolute pressures upstream and downstream of the turbine, downstream of the supercharger, and in a cylinder of the engine, with relation to the crankshaft angle.

Figures 7, 8 and 9 show the invention embodied in an eight-cylinder engine having two separate exhaust lines, between engine and turbine and two separate turbine inlets, wherein:

Figure 7 shows a schematic side view;

Figure 8 is a diagrammatic view showing the crank positions;

Figure 9 is a diagrammatic view showing the absolute pressures upstream and downstream of the turbine, downstream of the supercharger, and in a cylinder with relation to the crank-shaft angle.

Figure 11 is a diagrammatic view of the crank shaft positions of the engine shown in Figure 10;

Figure 12 is a partial cross-sectional view of the turbine blading and the ejector-like means of the engine shown in Figure 10 on an enlarged scale and in development;

Fig. 13 is a diagrammatic view illustrating the absolute pressure in the engine shown in Figure 10 upstream and downstream of the turbine with relation to the crankshaft angle;

Figures 14 to 17 inclusive illustrate a six-cylinder four-stroke engine having three separate exhaust lines between the engine and the turbine, and three separate turbine inlets wherein:

Figure 14 is a schematic side view of the engine with the exhaust turbine and the ejector-like means but without supercharger;

Figure 15 is a diagrammatic view illustrating the crank positions of the engine shown in Figure 14;

Figure 16 is a partial sectional view showing the turbine blading and the ejector-like means on a larger scale and in development;

Figure 17 is a diagrammatic view showing the absolute pressures upstream and downstream of the turbine, downstream of the supercharger, and in a cylinder with relation to the crank-shaft angle of the engine shown in Figure 14;

Figures 18, 19 and 20 show a 16-cylinder four-stroke engine in V-arrangement having four separate exhaust lines between the engine and turbine and four separate turbine inlets, wherein:

Figure 18 is a schematic side view of the engine with the exhaust turbine and the ejector-like means but without the supercharger;

Figure 19 is an end elevation of the engine shown in Figure 18 with a diagrammatic showing of the indicated crank-positions;

Figure 20 is a diagrammatic view showing the absolute-pressure conditions upstream and downstream of the turbine, downstream of the supercharger, and in an engine-cylinder with relation to the crank-shaft angle of the engine shown in Figure 18.

Figure 23:
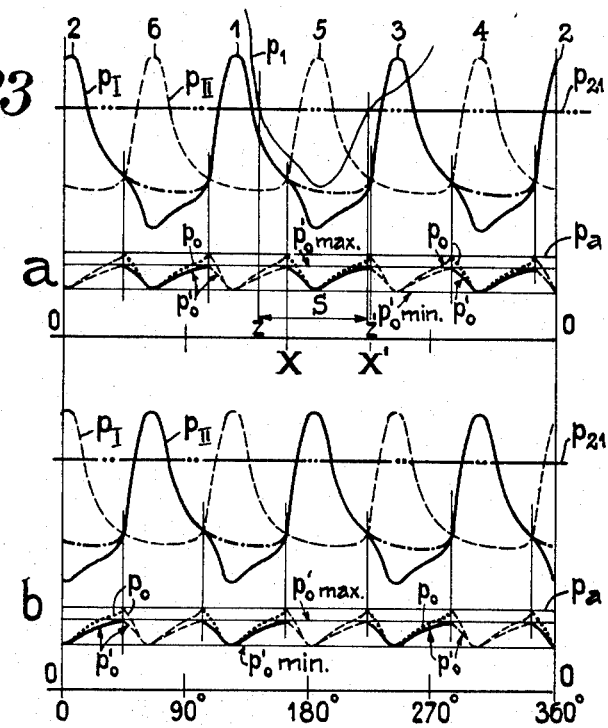
Figure 22:
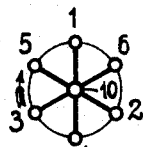
Figure 21:
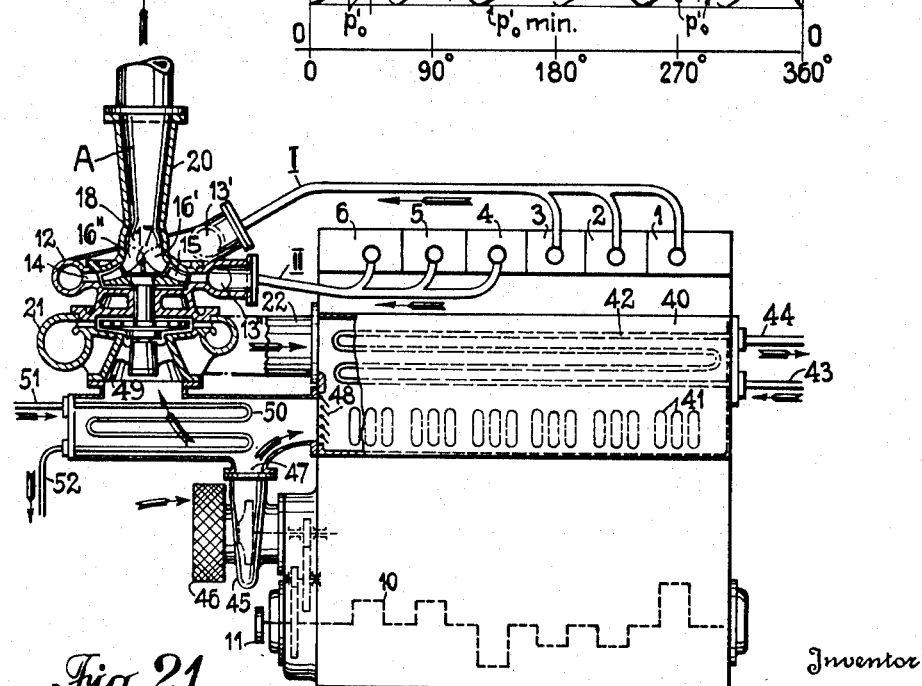

Figures 21, 22 and 23 show a six-cylinder two-stroke engine having two separate exhaust manifolds between the engine and turbine and two separate turbine inlets. An engine-driven supercharger s disposed below the turbine-driven supercharger and delivers its output directly into the engine or to the turbine driven supercharger.

Figure 25:
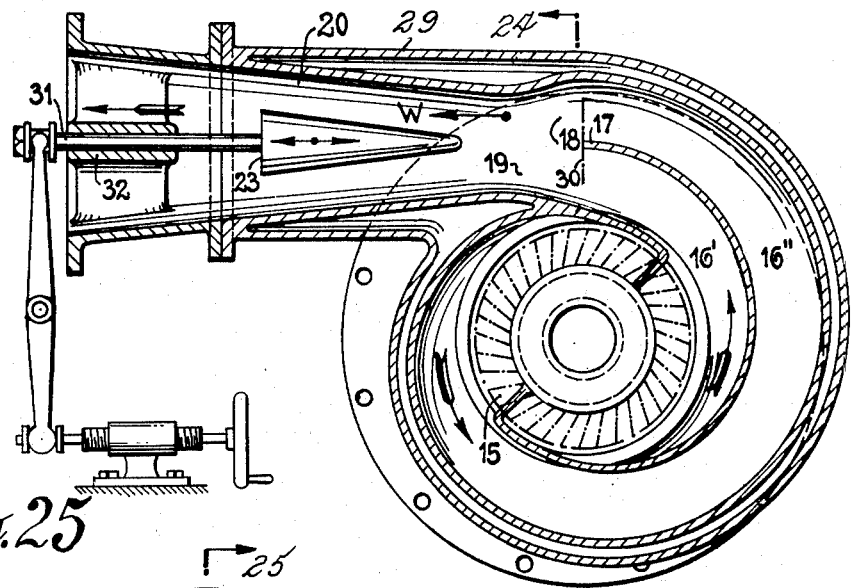
Figures 24, 26:
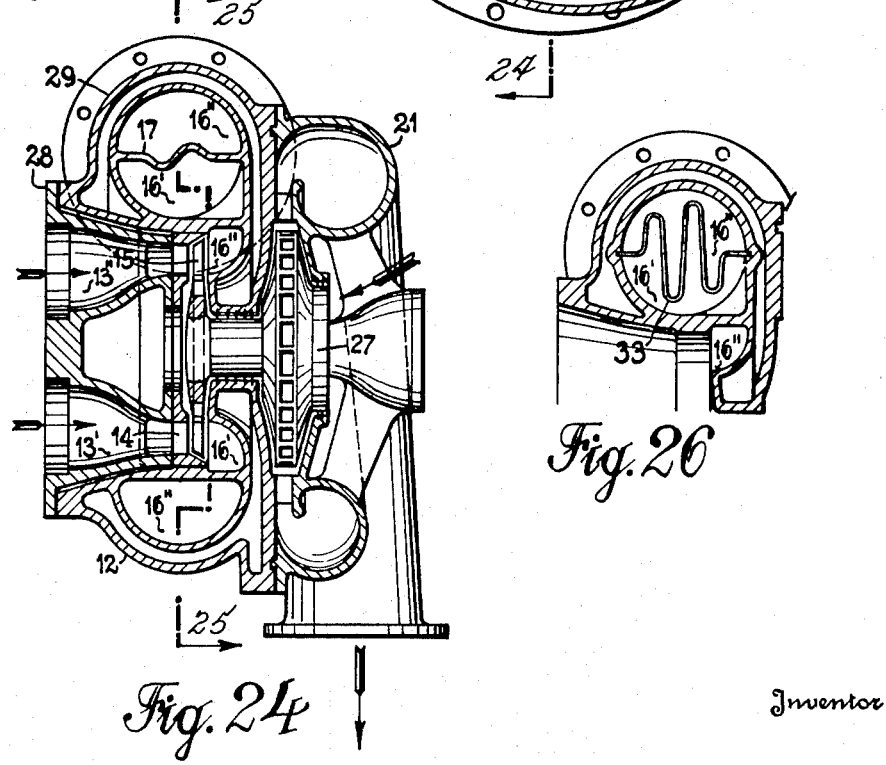

Figure 21 is a schematic side view of the engine with the vertically-disposed turbine-driven supercharger shown in section;

Figure 22 is a digrammatic view illustrating the crank-position of the engine shown in Figure 21;

Figure 23 is a diagrammatic view showing the pressure conditions upstream and downstream of the turbine, downstream of the supercharger, and in an engine cylinder with relation to the crank-shaft angle of the engine shown in Figure 21;

Figures 24, 25 and 26 show cross-sectional views through a turbine having an ejector-like means according to my present invention in a turbine having axial admission and a tangential gas outlet wherein:

Figure 24 is an axial sectional view on the section line 24—24 of Figure 25 looking in the direction of the arrows.

Figure 28:
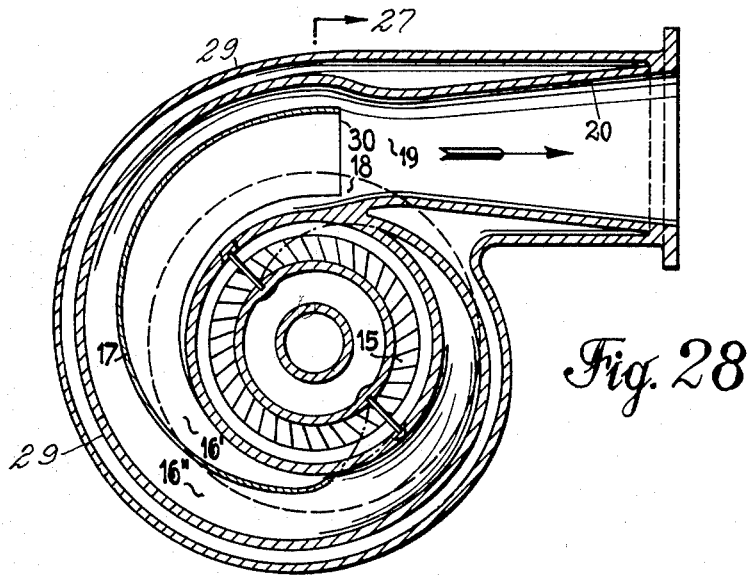
Figure 27:
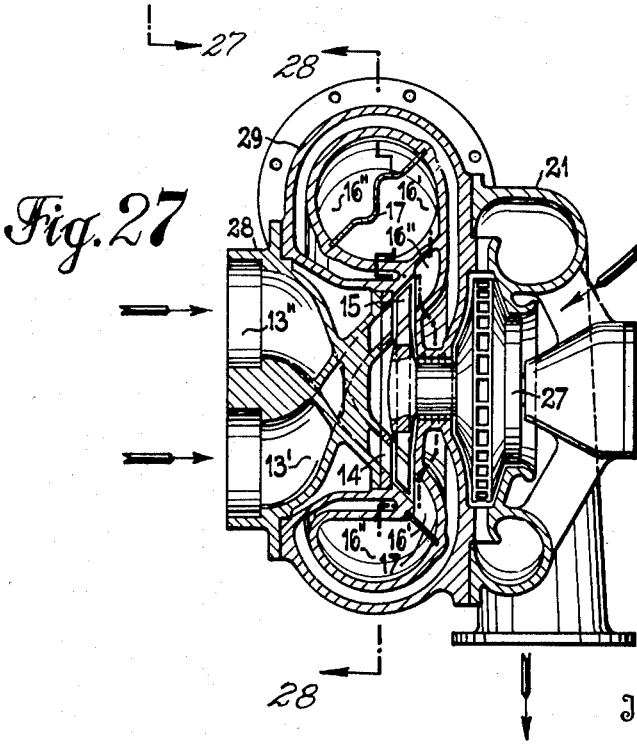

Figure 25 is a radial sectional view taken on the section line 25—25 of Figure 24 looking in the direction of the arrows;

Figure 26 is a partial radial sectional view illustrating a modification of Figure 25;

Figure 27 is an axial cross-sectional view taken on the section line 27—27 of Figure 28 through a turbine having an ejector-like means in a turbine of axial-radial admission and a tangential gas outlet;

Figure 28 is a radial cross-sectional view taken on section line 28—28 of Figure 27 looking in the direction of the arrows;

Figures 29 to 34 inclusive illustrate an example of a turbine and an ejector-like means in a turbine having radial-axial and outside admission and two separate gas inlets. The exhaust gases flow from the turbine in a radial-axial direction to the ejector-like means and substantially axially therein;

Figure 29 is an axial cross-sectional view taken on the section line 29—29 of Figure 30 looking in the direction of the arrows;

Figure 30 is a radial-cross-sectional view taken on section line 30—30 of Figure 29 looking in the direction of the arrows;

Figure 31 is a cross-sectional view taken on section line 31—31 of Figure 29;

Figure 32 is a cross-sectional view taken on section line 32—32 of Figure 29;

Figure 33 is a cross-sectional view taken on the section line 33—33 of Figure 29;

Figure 34 is a cross-sectional view taken on section line 34—34 of Figure 29 looking in the direction of the arrows;

Figures 35, 36, 36a and 37 show an example in a radial turbine having outside tangential admission and four separate gas inlets.

The gases flow from the turbine radially inwards and separately radially-axially into the collecting canals and from there axially into the mixing parts and the diffusors into two separate ejector-like means.

Figure 35:
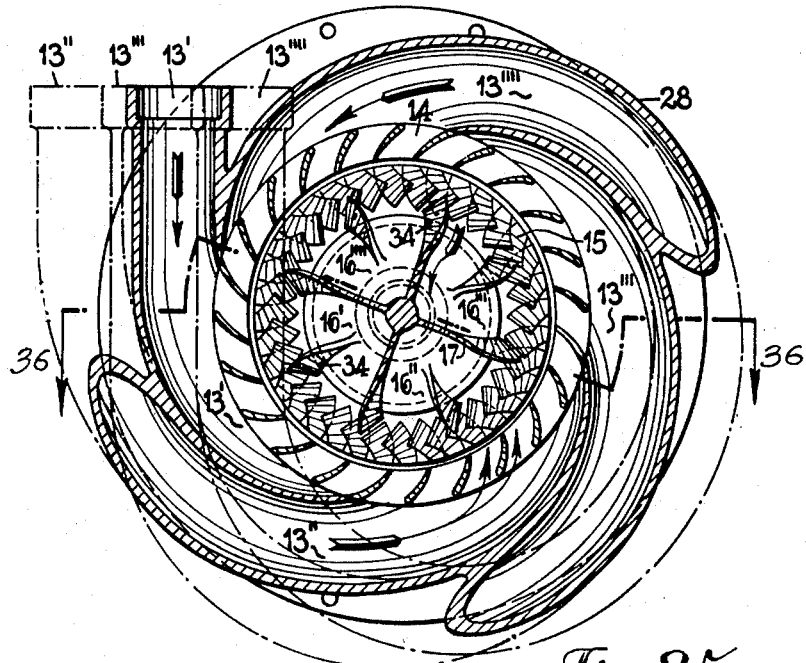
Figure 36:
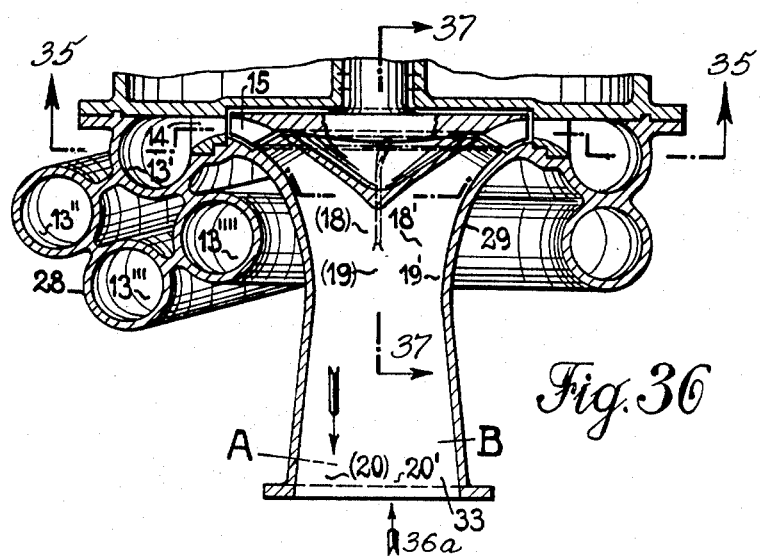

Figure 35 is a cross-sectional view taken on section line 35—35 of Figure 36 looking in the direction of the arrows;

Figure 36 is a cross-sectional view taken on the section line 36—36 of Figure 35 looking in the direction of the arrows;

Figure 36a is an elevational view of the diffuser and of the ejector-like means looking in the direction of the arrow 36a of Figure 36 illustrating the partition between the diffusers;

Figure 37 is a partial cross-sectional view taken on the section line 37—37 of Figure 36;

Figures 38 to 41 inclusive show a further example of an ejector-like means for a turbine, resembling the example shown in Figures 35, 36 and 37 wherein:

Figure 38 is a partial longitudinal sectional view taken on the section line 38—38 of Figure 39 through the turbine and the ejector-like means for a turbine which again comprises four separate inlets;

Figure 39 is a radial cross-sectional view taken on section line 39—39 of Figure 38;

Figure 40 is a radial cross-sectional view taken on section line 40—40 of Figure 38, and Figure 41 is a radial cross-sectional view taken on section line 41—41 of Figure 38 looking in the direction of the arrows.

In Fig. 1, the engine comprises six cylinders 1–6, a crank-shaft 10 and a coupling 11 through which the engine-power is delivered to the outside. The cylinders 1–3 exhaust through the manifold I into the entrance 13' of the turbine 12. The cylinders 4–6 exhaust through the manifold II into a second entrance 13" of the turbine 12. The engine combustion gases from the entrances 13', 13" of turbine 12 flow through the guide vanes 14 into the turbine rotor 15.

In accord with my present invention, an ejector-like means A is fixed to the turbine 12, comprising at least two collecting and guiding canals 16' and 16", at least one mixing part 18 and at least one adjoining diffusor 20. The turbine 12 drives a supercharger 21, which delivers its air through a line 22 to the cylinders 1–6.

Fig. 2, being an end-view of Fig. 1, as seen from the left of Fig. 1, shows the crank positions for the various cylinders 1–6 and the direction of rotation of the crank-shaft. The position of the cranks suitably is so chosen as to balance the rotary and reciprocating masses as far as practicable and to obtain favorable conditions with respect to torsional oscillations of the rotary masses. Further, the position of the cranks and the sequence of ignition should produce regular ignition intervals between the various cylinders. The latter, in the present case, are arranged at crank angles of 120°.

In Fig. 3, 13' and 13" are the separate inlet ducts of turbine 12, and 14 is the guide vane disc. The gases thus are guided separately from the two ducts 13' and 13" through the said disc to the turbine rotor 15.

The invention relates to internal combustion engines of the type in which the combustion products flow from the various cylinders under highly variable pressures which, however, are of different magnitude inter se, to the turbine. Such pressure shall attain a maximum value after opening the engine exhaust elements, and subsequently drop below the supercharging pressure in the course of the further exhaust period and at the beginning of the scavenging and introductory period. Such pressure condition is used according to my present invention to scavenge and charge the internal combustion engine cylinders as well as the turbine by means of charging air more thoroughly than would otherwise be possible.

In Figs. 3, 4 and 5 I have shown gas velocity triangles for a set of conditions at a given moment in which, as will occur in practice, the maximum pressure, preferably greater than the supercharging pressure, prevails in the inlet duct $13''$ at which moment a lower pressure prevails in inlet duct $13'$. Such condition at the inlet into the rotor $15$ then conforms to the inlet velocity triangle plotted in Fig. 4, wherein $u_1$ is the peripheral velocity, $c_1$ the absolute entrance velocity, and $w_1$ the relative entrance velocity of the gases into the rotor $15$.

In the absence of the subject matter of my present invention, a velocity triangle would result in the rotor entrance opposite the entrance portion $13'$, as indicated by the chain-dotted lines in Fig. 5. In the case of an equal $u_1$, an absolute inlet velocity $c_1''$ and a relative velocity $w_1''$ would result. Since the pressure in the entrance portion $13'$ at this moment is much less than the simultaneous pressure in the entrance portion $13''$, the resulting absolute velocity $c_1''$ upstream of the respective rotor segment is much less than $c_1$ in Fig. 4. The relative entrance velocity $w_1''$ in this segment, therefore, also will be much less than $w_1$ (Fig. 4). It is of special interest that the relative entrance direction of the gases into the rotor, i. e. of $w_1''$ in Fig. 5, is altogether different from that downstream of the inlet portion $13''$, i. e. of $w_1$ in Fig. 4. The two directions of $w_1$ and $w_1''$ differ by more than $90°$.

According to my present invention, however, the exhaust gases are conducted from the two entrance portions $13'$ and $13''$ downstream of the turbine rotor into a specially formed and dimensioned ejector-like means A, from which they are exhausted outwardly. The said ejector-like means A comprises two collecting- and guiding-canals $16'$, $16''$ which receive the gases flowing from the inlet portions $13'$, $13''$ through the turbine rotor blading $15$, and collect and conduct the same to the mixing part $18$.

Adjoining the rotor outlet, a partition vane $17$ may be provided for separating and guiding the two gas streams flowing from the rotor blading for at least some distance. The mixing-part $18$ adjoins a throat-portion $19$ which is followed by a diffusor-like divergent portion $20$.

In order to illustrate the result and effect of such an ejector-like means A, the velocity triangles at the rotor outlet are shown by dotted lines in Fig. 3. With a given peripheral velocity $u_2$ at the rotor outlet, there would result opposite to the entrance portion $13''$ a relative gas exit velocity $w_2$ and an absolute gas exit velocity $c_2$.

The absolute gas exit velocity $c_2$ obviously is greater than the absolute gas exit velocity $c_2''$ (chain-dotted) at the rotor blading segment opposite to the entrance portion $13'$. $c_2''$ would be the absolute gas exit velocity when this invention is not applied. The high gas velocity $c_2$ permits, when a structure according to the invention is used, to produce a sub-pressure in the ejector-like means A, especially in the collecting canals, the mixing part $18$, and up to the throat $19$. The sub-pressure then is again built up to the atmospheric pressure in the diffusor portion $20$.

The sub-pressure arising in the part $18$ affects the condition of the gases flowing into the turbine rotor $15$ through the entrance portion $13'$. The respective velocity triangle at the rotor entrance is plotted in dash lines in Fig. 5 wherein $u_1$ is the peripheral rotor speed, assumed to be equal to that shown in Fig. 4, $c_1'$ is the absolute gas entrance velocity. The latter is smaller than $c_1$ owing to the lower pressure and, thus smaller velocity of the gases in the entrance portion $13'$ than in the entrance portion $13''$. The resulting relative velocity $w_1'$ (dash-line triangle) thus also is smaller than $w_1$ (Fig. 4). The two velocities $c_1'$ and $w_1'$, however, are greater than $c_1''$ and $w_1''$, since a subatmospheric pressure is produced downstream of the turbine rotor. More gas or, respectively, scavenging air, therefore, passes from the entrance portion $13'$ through the rotor $15$ than in a construction different from the one according to my present invention. Also a higher relative gas velocity $w_2'$ and a higher absolute $c_2'$—with the same peripheral velocity $u_2$—will arise at the rotor exit than in the absence of the ejector-like means A. The respective velocity triangle also is shown in Fig. 3 by dash lines. When, however, no ejector-like means A is provided downstream of the turbine, so that only a smaller pressure gradient is present between $13'$ and the space downstream of the turbine, a velocity triangle results—with the same peripheral speed $u_2$—which is shown in Fig. 3 by the chain-dotted lines, $w_2''$ being the corresponding relative gas exit velocity and $c_2''$ the absolute exit velocity. These two latter velocities are considerably lower than $w_2'$ and $c_2'$.

Further, the absolute exit direction $c_2'$ is quite different from that of $c_2''$ which, as shown, may be forward in the sense of rotation of the rotor $15$. The ejector-like means A may bias the direction of $c_2'$ more or less axially or rearwardly. It will be appreciated from an interpretation of the chain-dotted gas entrance and gas exit diagrams (Figs. 5 and 3) that—for the state of operation shown, without the ejector-like means A—the turbine performance or output may be very small or even negative. In such case, high impact losses will result, since the directions of gas flow no longer correspond to the blade entrance directions. Such condition impedes very much the action of the gases entering at low pressure through the entrance portion $13'$. The respective rotor segment in such case then even may drag.

When providing, however, an ejector-like means A in accord with my present invention, also the rotor segment acted on under a lower pressure nevertheless will give a positive performance. The absolute gas exit direction $c_2'$ also will be different and not deviate any longer so much from the absolute exit direction according to $c_2$ resulting from the higher pressure prevailing in the entrance portion $13''$.

The gas-collecting and guiding-ducts $16'$ and $16''$ have such a position and preferably substantially equal through flow sections and a fashioning of its inner walls, as to accommodate the gas streams from the two entrance portions $13'$ and $13''$ with as little losses as possible and to conduct the same to the mixing-part $18$. The rotor segment opposite to the entrance portion $13'$ now operates under a higher pressure gradient down-stream than in a turbine operating without my present invention. The work done on this turbine segment, therefore, also will be higher, apart from the fact (as mentioned before) that the efficiency of energy conversion also will be better owing to lower impact losses. Even with an exhaust gas energy of like magnitude, a higher effect of scavenging and also of charging will be attained.

The partition vane $17$ suitably also is so formed as to convey, together with the walls of $16'$ and $16''$, the gases as far as possible without loss of velocity into the mixing-space $18$. The entrance angle of the partition vane $17$ should preferably correspond to the direction of the absolute exit velocity $c_2$ and the direction at its outlet end should preferably correspond with the direction of the mixing-part $18$ and the diffuser $20$. The gas velocity produced in the ejector-like means A is designated by $w$. An adjustable filler or deflector $23$ may be disposed axially movable for example, in the adjoining diffuser $20$, by means of which the pressure generation in the diffusor $20$ may be influenced, e. g. when the engine load is variable. The filler may also reach into the mixing-part, as shown in Fig. 29.

In Fig. 6, $p_I$ is the absolute pressure in the exhaust manifold I or in the entrance portion $13'$, and $p_{II}$ the absolute pressure in the exhaust manifold II or in the entrance portion $13''$ upstream of the turbine $12$. The said pressures are plotted as a function of the crank angle from 0 to 720°, i. e. throughout a full working-period of a four-stroke engine. The top diagram $a$ shows in full lines the gas pressures $p_I$ upstream of the turbine, i. e. in space 13' and the bottom diagram $b$ shows the pressures $p_{II}$ in space 13'' also in full lines. The gas pressures $p_{II}$ in 13'' and $p_I$ in 13' are shown in dash lines in the diagrams $a$ and $b$ respectively. The numbers 1–6 indicate the cylinders from which the exhaust surges issue. The pressure drops following such surges correspond to the scavenging and supercharging processes in the same cylinders.

The particular combination of the two gas streams from 13' and 13'' in an ejector-like means downstream of the turbine, as described above and provided that the absolute gas exit velocity in a rotor segment is higher than in another, results in a lower pressure downstream of the turbine than when no such ejector-like means is provided for. The dotted lines $p_0$ indicate the run of such subpressure, while $p_a$ represents the magnitude of the absolute outside back-pressure. In connection with my present invention, $p_0$ becomes less than $p_a$, at least temporarily. As noted below a further subpressure effect is obtained from the action of the diffusor-like divergent portion 20 of the member A. The dotted curve $p_0$ disregards that effect and signifies only the subpressure resulting from the ejector action arising from the different absolute exit velocities of the gas from the two rotor segments.

Following in diagram $a$ the curve of the exhaust pressure $p_I$ derived from cylinder 1, we note that at the crank angle $x$ the pressure $p_{II}$ (dash line) upstream of the turbine, originating from the cylinder 5, equals the pressure $p_I$ originating from the cylinder 1. The pressure $p_{II}$ subsequently rises above the pressure $p_I$, and then drops again. At the crank angle $x'$, $p_{II}$ again equals the pressure $p_I$ prevailing in the exhaust manifold I or in the space 13'. It will be appreciated, therefore, that intermediate the crank angle positions $x$ and $x'$ the ejector-like outlet means A gives origin to a sub-pressure $p_0$ (shown by a dash line) downstream of the turbine rotor. Let the absolute pressure, at which supercharging-air is supplied to the engine through the supercharger 21 and the line 22, be represented by $p_{21}$. The pressure ratio $p_{21}:p_0$ between the pressure at the entrance of the charging air into the engine and that at the exit portion from the turbine 12, therefore, constantly varies. In an engine operating without such ejector action, such pressure ratio is less, i. e. only $$\frac{p_{21}}{p_a}$$

The back-pressure $p_a$ is higher than $p_0$.

As set out above in describing Figs. 3–5, the invention also provides for a higher turbine effect and, therefore, also for a higher supercharger output. The charging-pressure $p_{21}$, therefore, also is higher than in constructions of prior art. Obviously, different pressures prevail at the various points intermediate the air entrance into the engine and the exit from the turbine. Such pressures adjust themselves to certain values intermediate the charging-pressure $p_{21}$ upstream of the cylinders and the turbine exit pressure $p_0$. In the diagram $a$, $p_1$ for example represents the pressure in the cylinder 1 during its exhaust— and inlet period. Such pressure $p_1$ is slightly higher than the pressure $p_I$ at the same moment upstream of the turbine, as long as the gases flow from cylinder 1, without hindrance and unbiased by the exhaust of another cylinder into the same manifold. It will be appreciated that the pressure $p_I$ intermediate the crank angle $y$ and $y'$ may drop below the exhaust back-pressure $p_a$ (e. g. the atmospheric pressure). If the engine were operating against the back-pressure $p_a$, without provision of a downstream subpressure according to my present invention, the absolute pressure upstream of the turbine would drop only to the pressure $p_I''$ as shown by the chain-dotted line. Diagram $b$ shows the same subpressure $p_0$ downstream of the turbine as diagram $a$, and shows, by comparison of curves $p_{II}$ and $p_{II}''$ the decrease in the pressures ahead of the turbine during the scavenging and charging periods of the cylinders 5, 6 and 4.

When the type of engine, exhaust manifolds and turbine 12 are such that in the crank positions $x$ and $x'$ of the engine (diagram $a$) the absolute pressure $p_I$ therein is higher than $p_a$ or $p_0$ respectively, a certain subpressure is produced additionally, i. e. without regard to the ejector-action $c_2$ per se, when a diffusor is attached to the mixing-space of the ejector-like means A. Such condition is plotted in Fig. 6, in full-line sections $p'_0$. While $p_0$ illustrates the curve of the subpressure brought about by the ejector effect only, $p'_0$ illustrates the subpressure brought about by both said diffusor and gas velocity effects. The values of $p'_0$ at the crank angles $x$ and $x'$, diagram $a$, represent the partial vacua attainable through mere diffusor action downstream of the turbine at these crank positions because at those crank angles, there is practically no ejector effect, $p_I$ being equal to $p_{II}$. When in the continuous rotation of the engine, the pressure $p_{II}$ rises above $p_I$, the ejector-like suction effect in the ejector apparatus A as described above, also takes place. The pressure $p'_0$ then drops, both on account of such ejector effect set up by the pressure difference $$\frac{p_{II}}{p'_0}$$

originating from the group of cylinders 5, 6 and 4, and of the effect $$\frac{p_I}{p'_0}$$

i. e. owing to the effect of the subpressure from the group of cylinders 1, 3 and 2 as long as such latter effect prevails. At the crank angles $x$ and $x'$, however, where there is practically no ejector action, as $p_I = p_{II}$, $p'_0$ will represent the subpressure downstream of the turbine, set up in the diffusor 20 by the two gas streams from 13' and 13''. The temperature of these two gas streams under the same pressure cannot be exactly alike, which fact, however, will not cause any great difference in the conditions stated, but at the most a slight variation in the pressure condition, which is readily understood by anyone skilled in the art. The corresponding pressure difference is not shown in Fig. 6, since it cannot be clearly plotted in the selected pressure scale. In the crank positions $x$ and $x'$, $p'_0$ attains a maximum value (minimum vacuum). The maximum combined subpressure from the diffusor and ejector effects takes place intermediate of $x$ and $x'$, where $p'_0$ will be a minimum (maximum vacuum).

Figure 7:
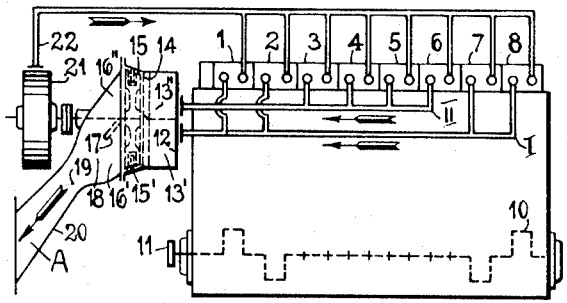

In Fig. 7, the eight cylinders of an internal combustion engine are designated by the numerals 1–8. The exhaust from the cylinders 1, 2, 7 and 8 flows through a manifold I and that from the cylinders 3–6 through a manifold II into the turbine 12. Manifold I opens into the entrance portion 13' and manifold II into the entrance portion 13'' of turbine 12. The turbine comprises a guide-disc 14 and a rotor 15. The latter has two rows of blades and intermediate guide-vanes 15', since it is assumed that a high, i. e. supersonic pressure ratio is utilized in the turbine at least from time to time. An ejector-like means A adjoins the turbines and comprises two collecting and guiding canals 16' and 16'', a partition vane 17, a mixing part 18, a throat 19 adjoining the latter, and a diffusor 20. Numeral 21 designates the supercharger driven by the turbine 12 and delivering air through a manifold 22 to the cylinders 1–8. Numeral 10 is the engine crankshaft, and 11 is the power take-off.

Figure 8:
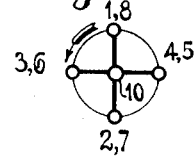

Fig. 8 shows the crank positions of the engine and its direction of rotation, as seen from the right side of Fig. 7.

Figure 9:
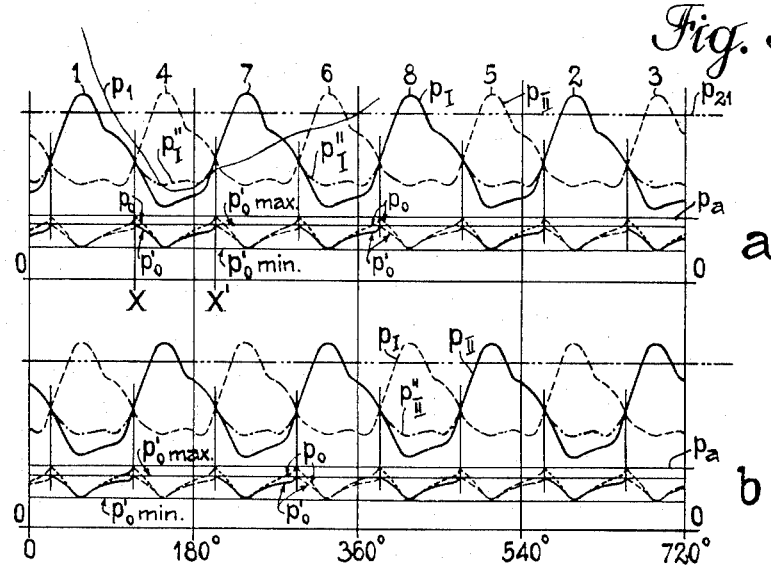

In Fig. 9, in the diagram $a$, the full line represents the pressure $p_I$ upstream of the turbine, i. e. in the entrance portion 13', resulting from the cylinders 1, 7, 8 and 2. The pressures downstream of the turbine are designated by $p_0$ and $p'_0$ respectively, and the pressure in the cylinder 1 during the outlet and inlet processes of the engine by $p_1$, while $p_a$ is the exhaust back-pressure (e. g. the atmospheric pressure) outside the ejector-like means A. Since four cylinders exhaust into the same manifold, their exhaust surges succeed each other at a comparatively quick rate in this example, i. e., at 180°. The exhaust pressure $p_{II}$ in the entrance portion 13″, arising from the cylinders 4, 6, 5 and 3 and shown in the diagram $a$ by dash-line acts on to the same ejector-like means A as previously by the exhaust gases from the cylinders 1, 7, 8 and 2, through the entrance portion 13′. Pressure $p_{II}$ produces there, i. e. in the spaces 16′ and 16″ or, respectively, in the mixing space 18, a subpressure $p_0$ shown by a dotted line during the time in which $p_{II}$ is higher than $p_I$ issuing from the cylinders 1, 7, 8 and 2.

When moreover, as plotted in Fig. 9a, the pressure $p_I$ at the crank angle $x$ is equal to $p_{II}$, but greater than $p_a$ and $p_0$, and when these pressures create a certain absolute exit velocity downstream of the turbine, a subpressure also is produced downstream of the turbine thereby, since a diffusor is annexed to the mixing space. The combined subpressure from ejector and diffusor effects is designated by $p'_0$. An ejector effect, however, does not arise at the crank angle $x$ when the two pressures $p_I$ and $p_{II}$ and the kinetic energies are equal. On further rotation of the engine, the ejector-effect is increased owing to the pressure $p_{II}$ rising with respect to $p_I$, which fact is indicated by the falling pressure line $p_0$. As long as $p_I$ on such crank path is greater than $p_0$, the subpressure is still further intensified to $p'_0$ with respect to the outside pressure $p_a$, until a value $p'_{0\,min.}$ (maximum vacuum) is attained. Such latter value, therefore, represents the lower limit of the pressure downstream of the turbine. At the crank angle $x'$, the pressure $p'_0$ again reaches its maximum $p'_{0\,max.}$ (minimum vacuum), and thus periodically fluctuates between the two limits $p'_{0\,max.}$ and $p'_{0\,min.}$.

During the entire period $x—x'$ therefore, a subpressure with respect to the outside pressure $p_a$ exists downstream of the turbine. The ratio $$\frac{p_{2l}}{p'_0}$$

between the pressure of the scavenging air at the cylinder entrance and the pressure downstream of the turbine thus is always greater than it would be ($p_{2l}:p_a$), i. e. in an engine not operating according to my invention. The result obtained with my invention is that more scavenging air flows through the engine, the exhaust manifolds and the turbine than without it. During the entire period of the subatmospheric pressure, therefore, also the pressure $p_I$ upstream of the turbine 12, as well as $p_1$ in the cylinder will drop to a lower value than in an engine without my invention. In the latter case, the pressure upstream of the turbine would be as represented substantially by the chain-dotted line $p_I''$.

The diagram $b$ in Fig. 9 shows similar pressure conditions as diagram $a$, but during the scavenging periods of the cylinders 4, 6, 5 and 3. In such case, the total subpressure $p'_0$ downstream of the turbine 12 is produced by means of my invention by the pressure difference between $p_I$ and $p_{II}$, and the pressure difference between $p_a$ and $p'_0$, i. e. by the pressure surges $p_I$ in the entrance portion 13′ originating from the cylinders 1, 7, 8 and 2.

Figure 10:
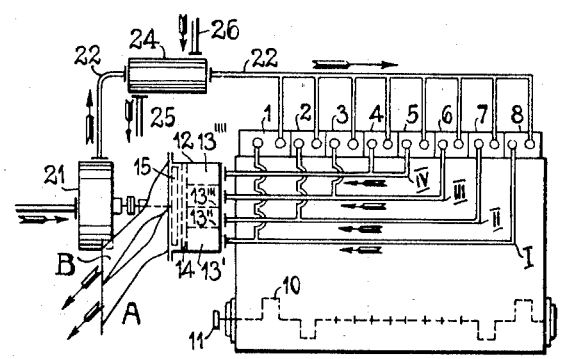
Figure 10 is a schematic side elevation of a further modification.

In Fig. 10 the engine has eight cylinders 1–8. The four separate exhaust lines are designated by I, II, III and IV and their four separate turbine entrance portions by 13′, 13″, 13‴ and 13⁗. The crankshaft is designated by 10, its power take-off by 11, and the turbine guide-vane disc and rotor by 14 and 15 respectively. Two separated ejector apparatuses A, B, are provided. In the collecting and guiding canals of the ejector-like means A and B no partitions 17 as shown in Figs. 3 and 12 are existent. The turbine 12 drives a supercharger 21 which delivers air through a line 22 to the cylinders 1–8. The supercharged air is cooled by a cooling unit 24 having a supply line 26 and a discharge line 25.

Fig. 11 shows the sense of rotation of crank-shaft 10 and the position of the cranks of the cylinders 1–8, as seen from the right side of Fig. 10.

Fig. 12 shows the specific arrangement of the turbine and the two separated ejector-like means A, B annexed thereto. The entrance ducts of the turbine are shown at 13′—13⁗. The guide-disc 14 and rotor 15 are shown in the developed state, and one sees that the gas-streams flowing from the four exhaust lines I–IV also pass separately through the guide-disc 14. The guide vanes are constricted and then conically enlarged in the manner of De Laval nozzles. A higher, i. e. supersonic pressure ratio will be obtained in the turbine 12. A twin ejector apparatus A, B, is provided, each having two collecting and guiding canals 16′, 16″ and 16‴, 16⁗, a mixing part 18, 18′, a throat 19, 19′ and a diffusor-like enlargement 20, 20′. Between each of the two collecting-canals 16′, 16″ and 16‴, 16⁗, respectively, a partition blade 17 or 17′ is arranged. An adjustable cone structure 23, 23′ may be provided in each conical enlargement 20, 20′ for the purpose of varying as far as possible the velocity conversion to pressure in the two diffusors 20 and 20′ in function of the quantity and the energy of the gases passing through.

In Fig. 13, the absolute pressures upstream and downstream of the turbine are shown in four superjacent diagrams $a–d$. $p_I$ in diagram $a$ is the pressure upstream of the turbine as originating from the exhausts of the cylinders 1 and 8, and is plotted as a heavy line. In diagram $b$, the corresponding pressure $p_{II}$, originating from the exhaust process in the cylinders 7 and 2, is plotted in a similar manner, in diagram $c$ the pressure $p_{III}$ upstream of the turbine, originating from the exhaust processes in the cylinders 6 and 3, and in the diagram $d$ the corresponding pressure $p_{IV}$ derived from the cylinders 4 and 5. It will be appreciated from diagram $a$ that the exhaust pressure $p_{II}$ intermediate the crank angles $x, x'$ (dotted line), derived from the exhaust of cylinder 7, is higher than the exhaust pressure $p_I$ derived from the cylinder 1. During this period, therefore, the ejector-action in the apparatus A produces downstream of the rotor 15 a pressure $p_0$ lower than the outside pressure $p_a$ by virtue of the rising pressure- or velocity-differences. As described above in connection with the other examples, the scavenging of cylinder 1 as well as of the lines and turbine portions connected thereto, also during this period, will be intensified over that attainable by an engine not provided with my present invention. A similar process takes place in the wake of the exhaust surge of cylinder 2 with respect to an intensified scavenging of cylinder 8, as is also shown in diagram $a$. It also is shown there that in the crank angles, $x, x'$ already a subpressure $p'_0$ is produced, due to the absolute exit velocity downstream of the turbine. The pressures $p_I$ and $p_{II}$ then are equal. When the velocity and temperature of the two respective gas streams also are equal, they also produce due to the action of the diffusor 20 an equal subpressure $p'_0$ in the mixing-space. An ejector-action, however does not take place in such case. The diagrams $b–d$ illustrate the pressure conditions attainable by virtue of my present invention for the other cylinders 7, 2 and 6, 3 and 4, 5. The diagrams $a$ and $b$ show the pressures upstream and downstream of the turbine 12 in the range of the entrance ducts 13′, 13″ and the ejector-like apparatus A. The diagrams $c$ and $d$ illustrate the said pressure conditions with respect to the turbine entrance ducts 13‴, 13⁗ and the ejector-like member B.

In the diagrams $a–d$, also the pressures $p_I''$, $p_{II}''$, $p_{III}''$ and $p_{IV}''$, besides the pressures $p_I–p_{IV}$, are plotted as would result upstream of a turbine not provided with my present invention. The pressure of the supercharged air is illustrated by the line $p_{2l}$. $p'_0$ is the resulting total pressure curve downstream of the turbine when at the latter's outlet always a subpressure is produced without and with ejector-effect, as has been described in detail with reference to Figs. 6 and 9. $p'_{0\,min.}$ are the minimum (maximum vacuum) and $p'_{0\,max.}$ the maximum attainable (minimum vacuum) limit values of the subpressures downstream of the turbine with respect to the outside pressure $p_a$.

In Fig. 14, the engine comprises six cylinders 1–6 which exhausts through three separate manifolds I, II, III into the entrance ducts 13', 13'', 13''' of turbine 12. 10 is the engine crank shaft, and 11 the power take-off coupling. The turbine includes a guide-vane disc 14 and a rotor 15. Three ejector-like means A, B and C are provided.

Fig. 15 shows the positions of the cranks of the cylinders 1–6, as well as the sense of rotation of the engine, as seen from the right in Fig. 14.

As may be seen from Fig. 16, the ejector-like means A, B and C are arranged differently than in the previous examples. The difference is that the gases arrive from a turbine inlet chamber in two different ejector-like means, viz. half thereof each in the example shown. Four example, one half of the gases from the manifold I and the inlet 13' in the guide-vane disc 14, after having traversed the respective segment of rotor 15—enters the said means A, and the other half enters the said means B. When, therefore, a higher pressure or velocity energy prevails in the chamber 13' than in the two other chambers 13'' and 13''', a pressure $p_0$ less than the outside pressure $p_a$ is established in the two means A and B, and therefore, downstream of the chambers 13'', 13'''. Such absolute subpressure $p_0$ attainable in the two ejectors then, of course, is higher (smaller vacuum) than if only the gases from a single turbine inlet chamber subject to a lower pressure or velocity would flow from another turbine inlet chamber subject to a higher pressure or velocity into the same ejector-like means.

In the collecting- and guiding-canals of the ejector-like means A, B and C (Figs. 14 and 16) no partitions 17 as shown in Figs. 3 and 12 are existent. The mixing of the gas portions of different energies begins therefore already soon after their exit out of the rotor blading, at least on the joining surfaces of the gas streams leaving the rotor 15 at different velocities.

Fig. 17 illustrates the effect of the invention for this particular example. The top diagram $a$ shows at the left the generation of subpressure downstreams of the turbine, arising in the wake of the scavenging process of cylinder 1 on exhausting the cylinders 3 and 5. Such subpressure first is produced through the ejector-like means A, owing to the exhaust surge of cylinder 3, and then in B owing to the pressure surge of cylinder 5, which corresponds to the crank-angle distances designated by (A) and (B) in diagram $a$. In this example, a lower scavenging-pressure ratio $p_{21}:p_0$ or $p_{21}:p'_0$ is produced—owing to the lower subpressure in the ejectors A, B, C—than if only two cylinders would exhaust into the same ejector-like means, and only one cylinder would be scavenged at the same time. The duration of the subpressure period—in which $p_{21}:p_0$ or $p_{21}:p'_0$, respectively, is smaller—is longer, however, than in the case of an engine in which only the exhaust surge of one cylinder each is used for intensifying the scavenging-operation by means of an ejector-like means according to my present invention, as illustrated in Figs. 1–13. When the pressure in the cylinder 1 follows the curve $p_1$, a scavenging-period can be established during the crank angle S indicated in Fig. 17$a$. Obviously, however, one also may utilize actually a shorter period of scavenging, e. g. from constructional considerations.

In the right-hand portion of diagram $a$ (Fig. 17), the subpressures $p_0$ and $p'_0$ are plotted, as resulting in the wake of scavenging the cylinder 6 by means of the exhaust surges of the cylinders 4 and 2. In the diagram $b$ are shown the subpressure conditions downstream of the turbine rotor 15 during the scavenging-period of the cylinders 3 and 4 by means of the exhaust surges of the cylinders 5, 6 and 2, 1 respectively. The subpressure-periods downstream of the turbine are indicated by the crank-angle periods (C) and (A). In the diagram $c$ are shown the subpressures downstream of the turbine rotor 15 during the scavenging-periods of the cylinders 5 and 2 as induced through the exhaust surges of the cylinders 6, 4 and 1, 3 respectively. The subpressure-periods in the diagram $c$ are represented by the crank-angle periods (B) and (C). The subpressure attainable by virtue of the ejector-action is designated by $p_0$, and the attainable total subpressure by $p'_0$. At the minimum value of the pressure downstream of the turbine (maximum vacuum) the difference—in particular between $p'_0$ and $p_0$ in the present case—is not so very great. Only if the pressure ahead of the turbine resulting from the cylinder to be scavenged is still above the back-pressure $p_a$ there will be besides the ejector-action creating the subpressure $p_0$ and resulting from the pressure differences $p_{II}—p_I$, $p_{III}—p_{IV}$, etc. a further increase of the vacuum up to the pressure $p_0$. Such an increase, therefore, is not very marked in the Fig. 17, similar the same as shown in the Figs. 6, 9 and 13. In Fig. 17 the lowering of the pressures $p_I$, $p_{II}$, $p_{III}$ ahead of the turbine during the ejecting and evacuating period of the invention is not shown. Only the course of the pressure before the turbine is shown in chain-dotted lines, when such proposed effect is not present.

In Figs. 18 and 19, the engine comprises two banks of eight cylinders, each, viz. 1–8 and 1'–8' in V-arrangement. Again, the crankshaft is designated by 10, and the power take-off coupling by 11. The cylinders 1, 1', 8 and 8' exhaust through a manifold I into the turbine 12, the cylinders 2, 2', 7 and 7' through a manifold II, the cylinders 3, 3', 6 and 6' through a manifold III, and the cylinders 4, 4', 5 and 5' through a fourth manifold IV. The turbine entrance ducts 13', 13'', 13''' and 13'''' correspond to the manifolds I—IV respectively. The turbine guide-vane disc is designated by 14 and the turbine rotor by 15. Two ejector-like means A and B are disposed downstream of the rotor 15. Here also, as in Fig. 14, it is assumed that the turbine drives a supercharger (not shown) which delivers its air to the engine in any suitable manner.

In the engine end-view shown in Fig. 19 are shown the crank positions and ignition timing respectively of the respective cylinders 1–8 and 1'–8'. Each of eight pairs of cylinders engages the same crank of the crankshaft. The ignition timing of two consecutive pairs of cylinders differs by an amount represented by the angle of aperture $\alpha$ of the V. On the centre-line of the engine and above the cylinders, the four exhaust manifolds I—IV are shown, and rearward of the latter the turbine 12 is shown.

Fig. 20 shows the pressures upstream and downstream of the turbine 12 as a function of the engine crank-angle throughout a full working-period of 720° of the engine. The diagram $a$ shows, in a full line, the pressure $p_I$ in the exhaust manifold I. This pressure $p_I$ upstream of the turbine, resulting from the cylinder-pair 1, 1', is lowered during the scavenging-period in the said cylinders through the action of the exhaust gases from the cylinders 7' and 7 (pressure $p_{II}$), which pass through the separate manifold II and entrance duct 13'' into the turbine, but which exhaust into the same ejector-like means A. Such lowering of the pressure $p_I$ upstream of the turbine is caused by the ejector-action downstream of the turbine, through which a pressure $p_0$ is produced which is lower than the exhaust counter-pressure $p_a$ against which the exhaust gases otherwise would flow from the turbine. Such subpressure $p_0$ lasts from the crank positions $x$ up to the crank position $x'$ at cylinder 1. The pressure in the latter during the exhaust and intake periods is represented by $p_1$.

S indicates the duration of the scavenging-period chosen for the engine in question. Such period, however, could be extended yet, as will be appreciated from the diagram. During the subpressure-period downstream of the turbine, also the pressure upstream of the turbine is lower than in the case of an engine operating without the means disclosed by my present invention. The pressure of such latter engine during this period is shown by the chain-dotted line $\bar{p}_I''$. In the right-hand portion of diagram $a$ are shown the same conditions (as described above in connection with the cylinders 1 and 1') arising during the scavenging-period of the cylinders 8' and 8. Again, in the diagram $b$ are shown the same conditions with respect to the cylinders 5', 5 and 4', 4 respectively, the diagram $c$ shows the same with respect to the cylinder pairs 7', 7 and 2', 2, and the diagram $d$ the said conditions with respect to the cylinder pairs 3', 3 and 6', 6. The diagrams $a$ and $c$ show the pressures upstream of and in the ejector-like means A, and the diagrams $b$ and $d$ those upstream of and in the ejector-like apparatus B. The pressures in the turbine entrance-chambers 13''' and 13'''' are represented by the curves $p_{III}$ and $p_{IV}$. The pressures which, without my invention, would exist upstream of the turbine 12 in the entrance chambers 13'', 13''' and 13'''' during the respective scavenging-periods, are represented by the chain-dotted curves $p_{II}''$, $p_{III}''$ and $p_{IV}''$. The charging pressure built up by the supercharger (not shown) and prevailing upstream of the intake elements of cylinders 1–8 and 1'–8' respectively, is represented by the heavy, chain-dotted horizontal line $p_{21}$.

The pressures $p'_0$ resulting as a whole downstream of the turbine are also plotted in the diagrams $a$—$d$. These pressures result, as mentioned at various occasions before from the still prevailing gas outlet velocities downstream of the turbine, resulting for instance from a cylinder to be scavenged, by means of which a subpressure (relative to $p_a$) downstream of the turbine may be produced when diffusor means are provided immediately downstream of the mixing-spaces, in addition to the ejector-like action of such gas outlet streams of different energies from the turbine, which exhaust simultaneously at different velocities into the ejector-like means disclosed by my present invention.

In Fig. 21, the numerals 1–6 designate the six cylinders of a two-stroke engine. Here again, 10 designates the engine crankshaft, and 11 its power take-off coupling. The cylinders 1–3 exhaust through the manifold I into the entrance portion 13' of the turbine 12. The cylinders 4–6 exhaust through the manifold II into a turbine entrance chamber 13'' which is separate from 13'. From the chambers 13', 13'' of turbine 12, the engine exhaust gases pass separately from each other through the guide-vane disc to the turbine rotor 15.

According to this embodiment of my invention, an ejector-like means A is affixed to the turbine 12. Such means A comprises two gas-collecting and -guiding canals 16' and 16'', the partition vanes 17, the mixing-part 18 and the adjoining diffusor 20. The supercharger 21 is driven by the turbine 12, and delivers its air through the line 22 to the scavenging-air receiver 40 of the two-stroke engine. The scavenging-air passes from the receiver 40 through the slots 41 into the cylinders 1–6, three slots being shown for each cylinder. In the said receiver 40, a cooler 42 may be arranged for the purpose of cooling the scavenging-air before entry into the cylinders through the inlet slots 41. The water is supplied through the line 43 to the cooler, and delivered therefrom through the line 44. A blower 45, driven by the engine, is provided and receives its air from the outside, e. g. through a filter 46. The air delivered by blower 45 passes into the space 47 from which it may pass directly through the louvers 48 into the receiver 40. Such short-cut is suitable, e. g., as long as the supercharger 21 does not yet produce any pressure higher than that produced by the blower 45. The mechanically driven blower 45, however, also can deliver its air directly through the space 47 and the entrance 49 into the turbine-driven supercharger 21. When the latter produces a higher pressure than the blower 45, the louvers 48 close and all the air delivered by the blower 45 passes into the supercharger 21, where it is further compressed and then passes into the receiver 40 and the engine cylinders. In the space 47, a cooler 50 may be arranged for the purpose of cooling the air delivered by the blower 45. The cooling-water for such cooler 50 is supplied through the line 51 and delivered through the line 52.

Fig. 22 illustrates the position of the cranks for the various cylinders 1–6 and the sense of rotation of the engine.

In Fig. 23, $p_I$ represents the absolute pressure in the exhaust manifold I and turbine entrance portion 13', and $p_{II}$ the absolute pressure in the manifold II and turbine entrance portion 13''. The pressures are plotted as a function of the crank angle from 0° to 360°, i. e. through a full working-period of a two-stroke engine. The upper diagram $a$ illustrates in full lines the gas pressures $p_I$ in chamber 13'; and the diagram $b$ in similar lines the pressures $p_{II}$ in chamber 13''. In diagram $a$, the gas pressures $p_{II}$ in the chamber 13'' and in diagram $b$ the gas pressures $p_I$ prevailing in the chamber 13' are indicated by dotted lines. The particular gathering-up of the two gas streams from the chambers 13', 13'' in an ejector-like means A downstream of the turbine, gives origin to a pressure (subpressure) lower than the outside pressure $p_a$ downstream of the turbine, when the absolute gas exit velocity in one of the two rotor segments involved is greater than in the other. The lines $p_0$ represent the said pressure, when $p_a$ denotes the outside pressure. Since $p_I$ and $p_{II}$ vary, $p_0$ temporarily at least becomes less than $p_a$.

Following in diagram $a$ the exhaust pressure $p_I$ issuing from cylinder 1, it will be appreciated that at the crank angle $x$, the pressure $p_{II}$ (shown dotted) upstream of the turbine, issuing from cylinder 5, is equal to $p_I$ issuing from cylinder 1. Later on, $p_{II}$ surpasses $p_I$ and then drops off again, reaching at the crank angle $x'$ the same pressure again as prevails in the exhaust manifold I. One may readily see that during the rotation of the crank from $x$ to $x'$, a subpressure (relative to the outside pressure $p_a$) is produced downstream of the turbine rotor through the ejector-like means A, as illustrated by the dotted lines $p_0$. It is assumed that scavenging and supercharging air is delivered through the supercharger 45 and 21 respectively, to the scavenging air line 40 and engine under the pressure $p_{21}$. The pressure ratio $p_{21}:p_0$ intermediate the entry of the said air into the engine and its exit from the turbine 12, therefore continuously varies.

The pressure in the cylinder 1 during the exhaust and the intake stroke is represented by $p_1$. In this case also, $p_1$ is greater than $p_I$ upstream of the turbine at the same instant. Such pressure difference depends on the cross-sections and shape of the flow passages of the engine and of the exhaust manifold to the turbine.

It is readily seen from diagram $a$ that intermediate the crank angles $z$ and $z'$, which crank path is designated by S, the pressure $p_1$ drops below the scavenging and supercharging-pressure $p_{21}$. During such crank-angle range, therefore, charging air flows into the cylinder. Such crank-angle range, therefore, may be used for scavenging and charging the cylinder.

In this example the engine, the exhaust manifolds, and the turbine 12 are so designed as to attain a positive value for the absolute gas outlet velocity from the turbine 12 at least at certain engine crank positions; such design per se affords a certain subpressure upstream of the diffusor 20, without an ejector-action. Such condition is illustrated in Fig. 23a by the difference between dotted lines $p_0$ and the heavy lines $p'_0$ which latter represent the total subpressure resulting from such subpressure-generation and the ejector-action. At the crank angles $x$ and $x'$, there is no ejector-action, $p'_0$ then being the subpressure alone as derived from the gas exit velocities from the turbine. At those crank angles the subpressure $p'_0$ does not result from a biasing of one of the two gas streams flowing into one and same ejector-like outlet means through the other.

By providing an ejector-like means as disclosed by my present invention, a subpressure is continuously produced downstream of the turbine 12 of Fig. 21, which subpressure, however, periodically fluctuates. The lowest pressure downstream of the turbine corresponds to the absolute pressure $p'_{0\,min.}$ (maximum vacuum) and the highest pressure (minimum vacuum) downstream of the turbine corresponds to the absolute pressure $p'_{0\,max.}$. The former pressure arises when in one of the two inlet ducts 16', 16" of the ejector-like apparatus A a maximum gas energy is present, whereby the gases entering the same means under lower energy is accelerated at maximum rate through ejector-action. By virtue of such ejector-action, the minimum pressure $p_0$ is produced. At this instant, the pressure $p_0$ is still further reduced to $p'_{0\,min.}$ through the action of the diffusor 20 connected to the mixing-space, provided that the gas outlet velocity from the turbine, resulting from the scavenged cylinder, still is positive. When the inlet pressure $p_I$ or $p_{II}$ upstream of the turbine, however, is (at least temporarily) lower than $p_a$—as has been assumed, e. g., in accord with Figs. 6 and 20—the ejector-action is intensified thereby owing to the greater pressure difference of the co-acting gas portions. The subpressure is no longer substantially lowered through an additional energy-effect, and $p'_0$ then is practically equal to $p_0$.

In the diagram $b$, the influence of the ejector-like means A on the scavenging and charging operations in the cylinders 6, 5 and 4 through the pressure surges issuing from the cylinders 1, 3 and 2, is illustrated in similar manner as in the diagram $a$. The resulting minimum pressure (maximum vacuum) of the two gas-energy effects then is given by $p'_{0\,min.}$ and the maximum pressure (minimum vacuum) downstream of the turbine by $p'_{0\,max.}$.

In Figs. 24–26, the turbine 12 comprises a guide-vane disc 14 and a rotor 15. The said turbine drives the blower-wheel 27 of a supercharger 21. Two separate gas-inlet ducts 13', 13" are provided in the turbine inlet-casing 28. After leaving the rotor 15, the exhaust gases entering from the inlet duct 13' flow into the collecting and guiding ducts 16' of the turbine outlet-casing 29. The latter surrounds the rotor 15 in a tangential direction and its cross-section is enlarged spiral-like, at least at its beginning. It has an outlet 30 into the mixing-space 18. The mass flow entering through the inlet duct 13" emerges into another, in its first part spiral-like enlarged duct 16" of the casing 29 after leaving the rotor 15. The duct 16" extends also in a tangential direction and overlaps the duct 16', superjacent same, being separated from the latter through the partition 17. The two ducts 16', 16" are advantageously so formed that the absolute exit velocity of the received gases, prevailing at the outlet from the turbine rotor 15, is maintained as much as possible throughout the entire length thereof. The two gas-streams flowing through 16' and 16" mix in the mixing-part 18, merging into each other downstream of its outlet cross-section 30. The exhaust gases alternatingly emerging with a higher velocity into the mixing-part 18 from the two collecting-canals 16' and 16" accelerate the gases flowing in the other with a lower velocity. Therefore, a gas velocity $w$ arises in the ejector-like means which is of variable size, alternating between the said two velocities. The maximum velocities may be in any part of the ejector-like means sub- or supersonic. A supersonic velocity may arise when the pressure ratio $$\frac{p'_0}{p_a}$$

in the respective part is supercritical. This latter is, for instance, the case when $$\frac{p'_0}{p_a}$$

in the diffusor 20 is smaller than $\beta$, where $$\beta = \left(\frac{2}{m+1}\right)^{\frac{m}{m-1}}$$

The factor $m$ depends, as is known from the laws of thermodynamics, of the kind of gases, etc. used. In accord with the attainable velocity $w$, an efficient pressure rise will be attained partly already in the mixing-part and especially in the adjoining diffusor 20, when these parts are properly built, dimensioned and shaped. The existent technical literature describes the respective experiences and results obtained so far. With a counter-pressure $p_a$ at the diffusor outlet, a certain maximum subpressure $p'_0$ is obtainable in the entrance portion of the mixing-part 18 and in the ducts 16' and 16" and downstream of the rotor 15. In the diffusor 20, a structure 23 of a certain conical shape may be provided and, as mentioned before, such structure may be axially displaceable relative to the diffusor 20. Such displacement may be performed, e. g., by means of a spindle 31 which is slidable in a bearing 32.

In order to render more effective the mixing of the two gas-streams after their exit from the collecting- and guiding-ducts 16' and 16", a corrugated partition or deflector 33 (indicated in Fig. 26) may be provided upstream of the nozzle 30, in place of the comparatively smooth partition 17.

Fig. 26 shows, in a partial radial cross-section of the ducts 16' and 16" an example of such a partition 33. The latter is so corrugated that the two gas-streams in 16' and 16" contact each other over as large a surface as possible at the nozzle 30. Such arrangement serves for the purpose of accelerating the gas-stream having a lower velocity through the gas-stream having a higher velocity, with a minimum loss of energy. The larger the contacting surface of the two gas-streams, the more effective and rapid such acceleration is.

The turbine of Figs. 27 and 28 comprises a guide-vane disc 14 and a rotor 15 which drives the blower-impeller 27 of the supercharger 21. Again, two separate gas inlet ducts 13' and 13" are provided in the turbine inlet casing 28. The said ducts, however, deliver the gases in an axial and radial direction to the guide-vane disc 14 and rotor 15. Again, two collecting- and guiding-canals 16' and 16" are disposed in spiral form downstream of the rotor 15. A relatively thin partition 17 between the two said canals is for instance so cast, e. g. in the turbine outlet casing 29 that the cross-section of the said ducts is gradually changed from the beginning of said ducts in such manner as to maintain substantially constant the absolute gas outlet velocity from the rotor 15 to the outlet nozzle 30 of the said ducts opening into the mixing-chamber 18. The throat of the diffusor 20 is denoted by 19. When in one of the two canals 16', 16" alternately a higher gas velocity prevails than in the other—which condition must prevail at least temporarily in an internal combustion engine involving my present invention—a certain velocity is produced thereby before and in the throat 19. A certain subpressure in the mixing-part 18 and the annexed ducts 16' and 16" corresponds to such velocities. Such subpressure in turn depends on the resulting gas velocity obtainable in the mixing-part and in the throat 19. The higher such latter velocity, the smaller the subpressure and the higher the vacuum downstream of the rotor 15. By reason of such latter velocity the total mass flow is compressed from such subpressure in the diffusor 20 to the outside pressure.

Again, the turbine of Figs. 29–34 comprises a guide-vane disc 14 and a rotor 15. The turbine inlet casing 28 comprises two inlet ducts 13' and 13", and the turbine outlet casing is denoted by 29. The gases on leaving the rotor 15 are received by suitably aligned guide vanes 34, then deflected and conducted into the canals 16' and 16" which are separated from each other by the partitions 17. The downstream end 30 of the latter is situated at the point of entry of the gases into the mixing-part 18. The cross-sections of the ducts 16' and 16" preferably are so chosen that the absolute gas exit velocity from the turbine is conserved as much as possible. From the mixing-part 18 the gases enter the throat 19 of the diffusor, then the conical enlargement 20 thereof, and then finally are discharged into the exit duct (not shown). The inside wall 35 of the duct portions 16', 16" suitably is so aligned that the gases flowing into each other are uniformly distributed immediately downstream of the exit end 30 substantially over the entire profile of the mixing-part 18 or, respectively, at the throat 19 of the diffusor. Such arrangement is intended to bring about a thorough and uniform intermingling of the gases flowing from the ducts 16' and 16" into the mixing-chamber 18.

The ducts 16' and 16" may be so formed in the direction toward the mixing-part 18, as illustrated in Figs. 29 and 31–33.

As will be appreciated from Figs. 31, 32 and 33 a corrugated partition 33—in place of a partition 17 which is plain and smooth throughout—is disposed at a certain distance upstream of the point of exit 30 where the gases emerge into the mixing-chamber 18. As will be seen from Fig. 31, such corrugated form is used intermediate the downstream end of the inside duct-walls 35 down to the point of exit 30. The corrugations commence close to the downstream end of the inside duct-wall 35 of the ducts 16', 16" where they are only slightly expressed (Fig. 31). Their number and their depth or height are gradually increased downstream towards the exit 30 (Figs. 32 and 33). The corrugations are so formed at the point of exit 30 (Fig. 33) that the two issuing gas streams—of which the cross-sectional areas are equal—interdigitate. Such arrangement affords a quick and efficient mutual influence of the two gas streams. It further will be appreciated from Fig. 29 that the outside diameter of the turbine outlet casing 29 intermediate of the sectional planes 31—31 and 33—33 is constant. At this distance, substantially only a surface-variation of the two gas streams shall be obtained, while maintaining their cross-sectional area, for the purpose of attaining a large contact-surface at the point of confluence of the two gas streams at 30.

It will be appreciated that at cross section 34—34 of Figure 29 there is neither a partition 17 nor a partition 33. The two gas streams, which at this point already have been thoroughly intermixed, fill the entire cross-section and their velocity is converted into pressure in the diffusor 20.

The throat 19' of the diffusor 20' and the latter itself are situated more closely to the turbine outlet. Such arrangement, however, is inferior in its effect, in particular as the two gas-streams flowing at unequal velocities, are not uniformly intermixed. In many cases, however, such arrangement will be sufficient.

In Figs. 35 and 36, the turbine inlet scroll case 28 comprises four inlet ducts 13', 13", 13'" and 13"", from which the gases flow tangentially through the guide-vane disc 14 into the rotor blading 15. From each said duct, the gases flow separately through a guide-vane segment and a rotor-blading segment. Downstream of the rotor blading, e. g. eight fixed interceptor vanes 34 are disposed, in such alignment as to provide as shock-free a reception of the gases from the rotor 15 as possible. Four of these vanes 34 are extended to form four separate duct portions 16', 16", 16'" and 16"". The gases flowing through the ducts 16', 16" and 16'", 16"" are conducted into two ejector-like tubular structures A and B respectively. The latter in the present example, comprise a mixing-part 18 or 18', a throat 19 or 19', and a diffusor 20 or 20'. All of these three parts are of semi-circular cross-section, and may be made, as shown, by inserting a partition 33 in a circular tube.

Fig. 37 shows the said partition 33 between the two ejector-like means, and the arrangement and range of the partitions 17 which separate the ducts 16', 16", 16'" and 16"". The said ducts receive, as mentioned before, the turbine exhaust gases through their specially formed inlet vanes 34 and ensure the transport thereof with a minimum loss. In this example a very lengthy mixing-part 18 with a very small and slow reduction of its through sections is shown. Such an execution will be especially of advantage when gases of high kinetic energy should produce a maximum ejection of another gas portion to be evacuated with an ejector-like means.

Fig. 38 shows an enlargement of the flow profile in direction of the flow on the distance where the corrugated partitions are provided. It is assumed in this example that at least the gas stream portions flowing into the mixing-part of the ejector-like means at the higher energy, shall be given a supersonic velocity before being mixed and evacuating the other gas stream portions flowing into the same ejector-like means. For such purpose, i. e. to create a supersonic velocity at the exit of the gas portion of the higher energy into the mixing-part it is necessary to enlarge the cross-section downstream of a throat adjoining about the cross-sectional plane 39—39 of Fig. 38, as in the case of a nozzle of the De Laval type.

In this example also, substantially radial partitions 17 (Fig. 39) are embodied in the turbine outlet casing downstream of the rotor 15. The said partitions, however, branch out, upstream of the mixing-space 18 or 18', in a plain partition 33" and in two corrugated partitions 33 and 33'. The form of the partitions 33, 33' and 33" may be seen from Fig. 40, distinguishing a radial plain center wall 33" and the corrugated partitions 33 and 33' disposed transversely of said wall 33". The said wall and partitions define an extension of the duct portions 16', 16", 16'" and 16"". The said partitions 33 and 33' extend downstream to their outside end 30 and 30', respectively situated upstream of the mixing-spaces 18 and 18'. Downstream of the said end or ends, only the partition 33" is present, down to the end of the two diffusor portions 20 and 20'. The latter, as shown, also are of semi-circular cross-section.

Fig. 41, presenting an upstream view, shows an end view of the corrugated partitions 33 and 33', as well as the vertical partition 33" in section.

Fig. 39 also shows the section through the duct portions 16', 16", 16'" and 16"" and through the walls 17 which are radially disposed there.

A construction or design set out in Figs. 38–41 comprising corrugated interleaving flow profiles, affords (as disclosed above in connection with Figs. 29–34) a better performance of the ejector-like means, since the gas streams—which impinge on each other under different velocities—interdigitate at a higher degree, i. e. they contact each other over a larger surface on being mixed.

In the diagrams of Figs. 6, 9, 13, 17, 20 and 23, are illustrated the pressure conditions upstream and downstream of the turbine, when the engine is subjected to a relatively high load. The invention, however, also affords an increased flow of scavenging-air at lesser engine loads, in a manner similar to that disclosed in connection with high engine-loads, which substantially facilitates and ensures also the starting and speeding up of the engine and the sudden increase in the power output thereof. Further, an engine provided with the ejector-like means disclosed, by my present invention, also operates under more favorable conditions of exhaust-gas temperatures.

Having now particularly described and ascertained the nature of my said invention and in what manner the same is to be performed, I declare, that what I claim is:

1. In combination, an internal combustion engine having a plurality of cylinders firing at different times, turbine means adapted to be driven by the exhaust gases discharged from said cylinders, at least two exhaust manifolds, each of which is adapted to deliver to the turbine means in a stream separated from that of the other manifold the exhaust gases from at least one of the engine cylinders, so that pressure surges occur in each gas stream at different times from the surges occurring in the other gas stream, said turbine means having a separate gas inlet passage for each gas stream delivered by the manifolding, said passage being formed to conduct its respective stream separately up to and into the turbine blading, and at least one ejector means disposed adjacent the exit edges of the turbine blading to receive at least a portion of each said stream upon its discharge from said blading, said ejector means including a collecting canal spanning a segment of the rotor blading from which said gas stream portions are discharged, said collecting canal being provided with at least one partition disposed therein and forming two separate ducts to continue the separation of said gas stream portions for at least some distance downstream of the rotor blading and a mixing chamber communicating with said canal and beginning in the area of the termination of the said partition therein, in which mixing chamber said gas stream portions are brought together as a common stream, said mixing chamber having an outlet through which the mixed gases are confluently discharged.

2. The combination as described in claim 1 wherein the ducts have cross-sectional areas approximating the cross-sectional areas of the outlet portions of the passages between the turbine blading spanned by the canal, measured transversely to the direction of the absolute gas velocity.

3. The combination as described in claim 1 wherein the engine has an even number of exhaust manifolds and of separate gas inlet passages in the turbine means, and a separate ejector means is provided downstream of the turbine for each pair of gas streams delivered to and passed through the turbine means.

4. The combination as described in claim 1 wherein there is provided a diffuser, said diffuser being disposed to follow, and in communication with, the outlet of the mixing chamber, and there is additionally provided a conical filler piece, movably insertable into and along the axis of the diffuser, and means to effect the desired extent of said insertion, said diffuser serving to convert into pressure the velocity of the gases which have passed through said outlet, and said insertable filler piece serving to vary the through flow sections of the diffusers and thereby to control the rate of such conversion.

5. The combination as described in claim 1 wherein the ducts are formed for at least part of their extent as spiral conduits, and the mixing chamber is disposed tangentially to the turbine.

6. The combination as described in claim 5 wherein there is provided a diffuser following and communicating with the outlet, said diffuser also being disposed tangentially to the turbine.

7. The combination as defined in claim 1 wherein the canal and the partition dividing the latter into two separate ducts are so shaped that confluent gas stream portions impinging on each other in the mixing chamber are united over practically their entire flow profile, thereby minimizing flow losses.

8. The combination as defined in claim 1 wherein the partition dividing the canal into two separate ducts is undulating in cross-section, particularly as it approaches, and at, its terminating edge, so that the gas stream portions conjoin over a relatively large area.

9. The combination as described in claim 1 wherein the ducts are formed as a rectilinear passage leading to the mixing chamber in the manner of De Laval-type nozzles, whereby at least momentary supersonic velocities of the gas stream portions may be created with minimum loss.

10. In a turbine having rotor blading adapted to be driven by at least two separate fluid streams, each said stream being continuously subject to high pressure pulsations out of phase with the high pressure pulsations of the other stream or streams, and in which turbine an inlet passage is provided to conduct each said pulsating stream separately up to and through said rotor turbine blading, at least one ejector means disposed adjacent the exit edges of the turbine blading to receive at least a portion of each said stream upon its discharge from said blading, said ejector means including a collecting canal spanning a segment of the rotor blading from which both of said gas stream portions are discharged, said collecting canal being provided with at least one partition disposed therein and forming two separate ducts to continue the separation of said gas stream portions for at least some distance downstream of the rotor blading and a mixing chamber communicating with said canal and beginning in the area of the termination of the said partition therein, in which mixing chamber said gas stream portions are brought together as a common stream, said mixing chamber having an outlet through which the mixed gases are confluently discharged.

11. A supercharged internal combustion engine system comprising an internal combustion engine having a plurality of cylinders firing at different times, each said cylinder having at least one inlet and outlet port, a centrifugal blower adapted to deliver air under pressure to the inlet ports of the engine cylinders, turbine means adapted to be driven by the exhaust gases discharged from said cylinders, said turbine means serving to drive the centrifugal blower, at least two exhaust manifolds, each of which is adapted to deliver to the turbine means in a separated stream from that of the other manifold the exhaust gases from at least one of the engine cylinders, so that pressure surges occur in each gas stream at different times from the surges occurring in the other gas stream, said turbine means having a separate gas inlet passage for each gas stream delivered by the manifolding, said passage being formed to conduct its respective stream separately up to and through the turbine blading, and at least one ejector means disposed adjacent the exit edges of the turbine blading to receive at least a portion of each said stream upon its discharge from said blading, said ejector means including a collecting canal spanning a segment of the rotor blading from which both of said gas stream portions are discharged, said collecting canal being provided with at least one partition disposed therein and forming two separate ducts to continue the separation of said gas stream portions for at east some distance downstream of the rotor blading and a mixing chamber communicating with said canal and beginning in the area of the termination of the said partition therein, in which mixing chamber said gas stream portions are brought together as a common stream, said mixing chamber having an outlet through which the mixed gases are confluently discharged.

12. In combination, an internal combustion engine having a plurality of cylinders firing at different times, turbine means adapted to be driven by the exhaust gases discharged from said cylinders, at least two exhaust manifolds, each of which is adapted to deliver to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means so disposed adjacent the exit edges of the turbine blading to receive at least a portion of each of the two gas streams the one during its peak pressure period and the other during its low pressure period upon its discharge from said blading, said ejector means including at least one collecting canal spanning over two segments of the respective rotor bladings from which both of said gas stream portions are discharged, whereby said gas streams from said two passages through the rotor blading are brought together as a common stream, whereby the gas stream of greater energy from at least one of said cylinders pulls the gas stream of smaller energy from at least one of the other of said cylinders along with it towards the outlet through which the mixed gas stream portions are confluently discharged, creating a subpressure behind the turbine blading increasing thereby the scavenging and charging effect of the internal combustion engine and the output of the turbine means.

13. In combination, an internal combustion engine having a plurality of cylinders firing at different times, turbine means adapted to be driven by the exhaust gases discharged from said cylinders, at least two exhaust manifolds, each of which is adapted to deliver to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means so disposed adjacent the exit edges of the turbine blading to receive at least a portion of each of the two gas streams the one during its peak pressure period and the other during its low pressure period upon its discharge from said blading, said ejector means including at least one collecting canal spanning over two segments of the respective rotor bladings from which both of said mixed gas stream portions are confluently discharged, and at least one common mixing chamber communicating with said collecting canal in which chamber said gas stream portions are brought closer together as a common stream, said mixing chamber having such a through section and length that the gases are thoroughly mixed and confluently discharged.

14. In combination, an internal combustion engine having a plurality of cylinders firing at different times, turbine means adapted to be driven by the exhaust gases discharged from said cylinders, at least two exhaust manifolds, each of which is adapted to deliver to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means so disposed adjacent the exit edges of the turbine blading to receive at least a portion of each of the two gas streams the one during its peak pressure period and the other during its low pressure period upon its discharge from said blading, said ejector means including at least one collecting canal spanning over two segments of the respective rotor bladings from which both of said mixed gas stream portions are confluently discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein in which mixing chamber said gas stream portions are firstly brought together as a common stream, said mixing chamber having an outlet through which the mixed gases are confluently discharged.

15. The combination as described in claim 13, wherein there is further provided a diffusor, said diffusor being disposed to follow, and being in communication with the mixing chamber and said diffusor serving to convert into pressure the velocity of the gases which have passed through the mixing chamber.

16. The combination as described in claim 15, wherein the collecting canal, the mixing part and the diffusor are laid out in series in the said order and are so disposed in direction with respect to the exit edges of the turbine blading and with respect to each other as to continue without substantial change the direction of the flow of the gases as they are discharged from said blading.

17. The combination as described in claim 12, wherein the collecting canals have cross-sectional areas approximating the cross-sectional areas of the outlet portions of the respective passages between the turbine blading segments spanned by the canal, measured transversely to the direction of the absolute gas velocity.

18. The combination as described in claim 12, wherein the entrance portion of the ejector means adjacent the exit edges of the rotor blading segments forms an angular space, the radially inner and outer diameter of which correspond approximately to the radially inner and outer diameters of the area of a radial section through that portion of the exit edge of the rotor blading segments through which the gas streams are passed into the ejector means.

19. The combination as described in claim 12, wherein all gas velocity producing duct as the turbine inlet nozzles and the ejector means are executed with convergent through-sections to avoid the creation of greater than subsonic gas velocities.

20. The combination as described in claim 12, wherein at least one velocity producing duct as the turbine inlet nozzles and the collecting canals are shaped and dimensioned with convergent/divergent through-sections so that the gas velocity in the turbine becomes at least temporarily supersonic.

21. The combination as described in claim 12, wherein the engine has an even number of separated exhaust manifolds and of separate gas inlet passages in the turbine means and a separate ejector means is provided downstream of the turbine for at least each pair of gas streams delivered separately to and passed through the turbine means.

22. The combination as described in claim 12, wherein the engine has an odd number of separate exhaust manifolds and of separate gas inlet passages in the turbine means, an odd number of separate ejector means is provided downstream of the turbine and each said ejector means is disposed to receive only one-half the mass flow of two of the streams from the separated manifolds.

23. The combination as described in claim 12, wherein there is provided at least a diffusor, said diffusor being disposed to follow and in communication with the outlet of the mixing chamber and there is additionally provided a conical filler piece movably insertable into and along the axis of the diffusor and means to effect the desired extent of said insertion, said diffusor serving to convert into pressure the velocity of the gases which have passed through said outlet, and said insertable filler piece serving to vary the through-flow sections of the diffusor and thereby to control the rate of such conversion.

24. The combination as described in claim 14, wherein the collecting canals are formed for at least part of their extent as spiral conduits and the mixing chamber is disposed tangentially to the turbine.

25. The combination as described in claim 24, wherein there is provided a diffusor following and communicating with the outlet of the mixing chamber, said diffusor also being disposed substantially tangentially to the turbine.

26. The combination as described in claim 13, wherein the mixing chamber is disposed in the turbine axis and the collecting canal conducting the gas streams to said chamber is at least partially axially directed.

27. The combination as described in claim 13, wherein the mixing chamber is disposed substantially parallel to the turbine axis and the collecting canal adjacent the exit edges of the turbine rotor blading are formed as an annular space, being defined on its radially inner area by a conically shaped wall extending from the innermost points on the edges of the rotor blading away therefrom towards the turbine axis, and on its radially outer area by a second wall beginning at the outermost points on the edges of the rotor blading and extending away from the rotor blading coaxially with said conically shaped inner wall, whereby the gas streams are deviated from their respective exit directions to a direction in the mixing chamber substantially identical with the direction of the turbine axis.

28. The combination as defined in claim 14, wherein the collecting canal and the partition dividing the latter into at least two separate ducts are so shaped that confluent gas stream portions impinging on each other in the mixing chamber are united over practically their entire flow profile, thereby minimizing flow losses.

29. The combination as defined in claim 14, wherein the partition dividing the canal into two separate ducts is undulating in cross-section, particularly as it approaches said turbine means, and at its terminating edge, so that the gas stream portions conjoin over a relatively large area.

30. The combination as described in claim 14, wherein the collecting canals are formed at least at its outlets as a substantially rectilinear passage leading to the mixing chamber in the manner of convergent-divergent type nozzles, whereby at least momentary supersonic velocities of the gas stream portions entering the mixing chamber or chambers may be created with minimum loss.

31. The combination as described in claim 12, wherein the engine has at least three cylinders, there are at least three manifolds and at least three gas inlet passages to the turbine, and a plurality of separate ejector means are provided downstream of the turbine, each said ejector-like means receiving at least a portion of the gas streams of two manifolds.

32. The combination as described in claim 12, wherein the engine has at least three cylinders, there are at least three manifolds and at least three gas inlet passages to the turbine, and a plurality of ejector means are provided downstream of the turbine, each said ejector means receiving at least a portion of the gas streams of two manifolds, said plurality of ejector means being arranged together in a common annular structure.

33. In a turbine having at least two inlet passages for two separate fluid streams, each said stream being continuously subject to high pressure fluctuations out of phase with the high pressure fluctuations of the other stream, and in which turbine an inlet passage is provided to conduct each said fluctuating stream separately up to and through the turbine blading, at least one ejector means disposed adjacent the exit edges of the turbine blading segments to receive at least a portion of each said stream upon its said discharge from said blading, said ejector means spanning the segments of the rotor blading from which both of said gas stream portions are discharged, and including a mixing chamber wherein said gas stream portions are brought together as a common stream, said mixing chamber having an outlet through which the mixed gases are confluently discharged.

34. In a turbine having at least two inlet passages for two separate fluid streams, each said stream being continuously subject to high pressure fluctuations out of phase with the high pressure fluctuations of the other stream, and in which turbine an inlet passage is provided to conduct each said fluctuating stream separately up to and through the turbine blading, at least one ejector means disposed adjacent the exit edges of the turbine blading segments to receive at least a portion of each said stream upon its said discharge from said blading segments, said ejector means including a collecting canal spanning the respective segments of the rotor blading from which both of said gas stream portions are discharged and a mixing chamber communicating with said collecting canal, in which chamber said gas stream portions are brought together as a common stream, said mixing chamber having an outlet through which the mixed gases are confluently discharged.

35. In a turbine having at least two inlet passages for two separate fluid streams, each said stream being continuously subject to high pressure fluctuations out of phase with the high pressure fluctuations of the other stream, and in which turbine an inlet passage is provided to conduct each said fluctuating stream separately up to and through the turbine blading, at least one ejector means disposed adjacent the exit edges of the turbine blading segments to receive at least a portion of each said stream upon its said discharge from said blading, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of said partition therein, in which mixing chamber said gas stream portions are brought together as a common stream, said mixing chamber having an outlet through which the mixed gases are confluently discharged.

36. The turbine arrangement as described in claim 33 wherein there is as a part of each ejector means further provided a diffuser, said diffuser being disposed to follow, and in communication with, the outlet of the mixing chamber, and said diffuser serving to convert into pressure the velocity of the gases which have passed through said outlet.

37. A supercharged internal combustion engine system comprising an internal combustion engine having a plurality of cylinders firing at different times, each said cylinder having at least one inlet and outlet port, a centrifugal blower adapted to deliver air under pressure to the inlet ports of the engine cylinders, turbine means adapted to be driven by the exhaust gases discharged from said cylinders, said turbine means serving to drive said centrifugal blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments said ejector means including a collecting canal spanning the segments of the rotor blading from which both of said gas stream portions are confluently discharged.

38. A supercharged internal combustion engine system comprising an internal combustion engine having a plurality of cylinders firing different times, each said cylinder having at least one inlet and outlet port, a centrifugal blower adapted to deliver air under pressure to the inlet ports of the engine cylinders, turbine means adapted to be driven by the exhaust gases discharged from said cylinders, said turbine means serving to drive the centrifugal blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged.

39. A supercharged internal combustion engine system comprising an internal combustion engine having a plurality of cylinders firing at different times, each said cylinder having at least one inlet and outlet port, a centrifugal blower adapted to deliver air under pressure to the inlet ports of the engine cylinders, turbine means adapted to be driven by the exhaust gases discharged from said cylinders, said turbine means serving to drive the centrifugal blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means, including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged.

40. A supercharged internal combustion engine as described in claim 37 wherein there is further provided a diffuser, said diffuser being disposed to follow, and in communication with, the outlet of the mixing chamber, and said diffuser serving to convert into pressure the velocity of the gases which have passed through said outlet.

41. In apparatus for charging and scavenging a multi-cylinder internal combustion engine by a blower driven by a turbine having the engine exhaust gas as its power source, the combination of separated compartments communicating with the inlet side of the turbine rotor, manifolding separately connecting each of said compartments with the exhaust outlet of predetermined cylinders selected to deliver exhaust gas under pressure fluctuations at different times to the compartments so that a high pressure in one compartment will occur simultaneously with a lower pressure in another compartment, a chamber adjacent the outlet side of the turbine rotor dimensioned to span and receive gases through the rotor from both of said compartments, said chamber including a mixing section in which the gases are brought together and from which they are confluently discharged through a constricted outlet section corresponding to the combined velocity of the gas streams, so that the gases at higher velocity received in the chamber through the rotor from the compartment having gas of higher pressure will eject the gases of lower velocity received through the rotor from the compartment receiving gas of lower pressure thereby reducing the pressure downstream of the turbine rotor segment with gases of lower velocity to increase their velocity through the turbine rotor and hence, the power delivered by the turbine, and to increase the pressure difference between that of the inlet charging and scavenging air from the blower to the engine cylinders and that of the gases downstream of the engine exhaust.

42. Apparatus for supercharging and scavenging an internal combustion engine having a plurality of cylinders firing independently at different times, comprising turbine means adapted to be driven by the exhaust gases discharged from said cylinders, at least two exhaust manifolds, each of which is adapted to deliver to the turbine means, in a stream separated from that of the other manifold, the exhaust gases from at least one of the engine cylinders, the manifolds being connected between the cylinders and the turbine means are selected for the two manifolds as having working cycles which are so opposed to each other that pressure fluctuations occur in each gas stream at different times from the pressure fluctuations occurring in the other gas stream, said turbine means having a separate gas inlet passage for each gas stream delivered by a manifold, said passage being formed to conduct its respective stream separately up to and to deliver it separately through the turbine blading, and ejector means disposed behind the turbine blading and spanning over two segments of the rotor bladings from which both said gas streams are discharged through said passages so that the ejector means receives both of said streams, said ejector means having a mixing chamber and an outlet leading from the mixing chamber, in which chamber said gas streams from said two passages through the rotor blading segments are brought together as a common stream, so that the gas stream of greater energy from one of said manifolds draws the gas stream of smaller energy from the other of said manifolds along with it toward the said outlet through which the mixed gas streams are confluently discharged and a diffusor joining said mixing chamber in which the velocity of the comprehended gas stream is transformed into approximately the surrounding pressure, thereby creating a subpressure behind the turbine blading which enhances the scavenging and charging of the internal combustion engine and increases the power of the turbine means.

43. The combination as described in claim 12, wherein there is further provided a diffuser, said diffuser being disposed to follow, and in communication with, the outlet of the collecting canal and said diffuser serving to convert into pressure the velocity of the gases which have passed through the outlet of the collecting canal.

44. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments said ejector means including a collecting canal opening the segments of the rotor blading from which both of said gas stream portions are confluently discharged.

45. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged.

46. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged.

47. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, axial turbine means adapted to be driven by the exhaust gases discharged from said cylinder, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other druing its low pressure period upon its discharge from said blading segments said ejector means including a collecting canal opening the segments of the rotor blading from which both of said gas stream portions are confluently discharged.

48. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged.

49. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged.

50. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments said ejector means including a collecting canal opening the segments of the rotor blading from which both of said gas stream portions are confluently discharged.

51. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged.

52. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged.

53. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments said ejector means including a collecting canal opening the segments of the rotor blading from which both of said gas stream portions are confluently discharged, wherein there is further provided a diffuser, said diffuser being disposed to follow, and in communication with the outlet of the mixing chamber, and said diffuser serving to convert into pressure the velocity of the gases which have passed through said outlet.

54. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged, wherein there is further provided a diffuser, said diffuser being disposed to follow, and in communication with, the outlet of the mixing chamber, said diffuser serving to convert into pressure the velocity of the gases which have passed through said outlet.

55. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged, wherein there is further provided a diffuser, said diffuser being disposed to follow, and in communication with, the outlet of the mixing chamber, and said diffuser serving to convert into pressure the velocity of the gases which have passed through said outlet.

56. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, axial turbine means adapted to be driven by the exhaust gases discharged from said cylinder, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments, said ejector means including a collecting canal opening the segments of the rotor blading from which both of said gas stream portions are confluently discharged, wherein there is further provided a diffuser, said diffuser being disposed to follow, and in communication with the outlet of the mixing chamber, and said diffuser serving to convert into pressure the velocity of the gases which have passed through said outlet.

57. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged, wherein there is further provided a diffuser, said diffuser being disposed to follow, and in communication with, the outlet of the mixing chamber, and said diffuser serving to convert into pressure the velocity of the gases which have passed through said outlet.

58. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged, wherein there is further provided a diffuser, said diffuser being disposed to follow, and in communication with, the outlet of the mixing chamber, and said diffuser serving to convert into pressure the velocity of the gases which have passed through said outlet.

59. A supercharged internal combustion engine system comprising an internal combustion engine having a plurality of cylinders firing at different times, each said cylinder having at least one inlet and outlet port, a blower adapted to deliver air under pressure to the inlet ports of the engine cylinders, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders and that pressure fluctuations occur in each gas stream independently of the fluctuations occurring in the other gas stream, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams the one during its peak pressure period and the other during its low pressure period upon its discharge from said blading segments said ejector means including a collecting canal opening the segments of the rotor blading from which both of said gas stream portions are confluently discharged, wherein there is further provided a diffuser, said diffuser being disposed to follow, and in communication with, the outlet of the mixing chamber, and said diffuser serving to convert into pressure the velocity of the gases which have passed through said outlet.

60. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged and a mixing chamber communicating with said canal, in which chamber said gas stream portions are brought together as a common stream, said mixing chamber having an outlet through which the mixed gases are confluently discharged, wherein there is further provided a diffuser, said diffuser being disposed to follow, and in communication with the outlet of the mixing chamber, and said diffuser serving to convert into pressure the velocity of the gases which have passed through said outlet.

61. A supercharged internal combustion engine system comprising an internal combustion engine having a plurality of cylinders firing at different times, each said cylinder having at least one inlet and outlet port, a blower adapted to deliver air under pressure to the inlet ports of the engine cylinder, radial-axial turbine means adapted to be driven by the exhaust gases discharged from said cylinders, said turbine means serving to drive the blower, at least two exhaust manifolds, each of which is adapted to deliver in sequence to the turbine means in a stream separated from that of the other manifold the exhaust gases from at least one of the engine cylinders, and that pressure fluctuations occur in each gas stream independently of the fluctuations occurring in the other gas streams, said turbine means having a separate gas inlet passage for each gas stream delivered by the manifolding, said passage being formed to conduct its respective stream separately up to and through the turbine blading segments, and at least one ejector means disposed adjacent the exit edges of the turbine blading to receive at least a portion of each of the two gas streams, the one during its peak pressure period and the other during its low pressure period upon its discharge from said blading segments, said ejector means including a collecting canal spanning the segments of the rotor blading from which both of said gas stream portions are discharged, said collecting canal being provided with at least one partition disposed therein and forming two separate ducts to continue the separation of said gas stream portions for at least some distance downstream of the rotor blading segments and a mixing chamber communicating with said canal and beginning in the area of the termination of the said partition therein, in which mixing chamber said gas stream portions are brought together as a common stream, said mixing chamber having an outlet through which the mixed gases are confluently discharged, wherein there is further provided a diffuser, said diffuser being disposed to follow, and in communication with, the outlet of the mixing chamber, and said diffuser serving to convert into pressure the velocity of the gases which have passed through said outlet.

62. In combination, an internal combustion engine according to claim 12, wherein at least two cylinders exhaust into one exhaust manifold and at least two other such cylinders which are scavenged exhaust into another exhaust manifold, the said manifolds delivering their gases separately through different turbine segments but collectively into at least one and the same ejector-like means.

63. In combination, an internal combustion engine according to claim 62, wherein the cylinders are arranged in different banks of a V-type engine, wherein at least two cylinders exhaust into one exhaust manifold and at least two other such cylinders which are scavenged exhaust into another exhaust manifold, the said manifolds delivering their gases separately through different turbine segments but collectively into at least one and the same ejector-like means.

64. The combination as set forth in claim 12, wherein all gas velocity producing ducts as the turbine inlet nozzles and the ejector means are executed with equal through-sections to avoid the creation of greater than subsonic gas velocities.

65. The combination as described in claim 12 wherein at least one velocity producing duct as the mixing chamber of the ejector means is shaped and dimensioned with convergent/divergent through-sections so that the gas velocity in the turbine becomes at least temporarily supersonic.

66. The combination as described in claim 12 wherein at least one velocity producing duct as the turbine inlet nozzles and the collecting canals is shaped and dimensioned with convergent/divergent through-sections so that the gas velocity in the ejector means becomes at least temporarily supersonic.

67. The combination as described in claim 12 wherein at least one velocity producing duct as the mixing chamber of the ejector means is shaped and dimensioned with convergent/divergent through-sections so that the gas velocity in the ejector means becomes at least temporarily supersonic.

68. In an apparatus for charging and scavenging according to claim 41, wherein said constricted outlet cross-section is situated substantially in the direction of the absolute exit velocity from the turbine rotor.

References Cited in the file of this patent

UNITED STATES PATENTS

| | | |
|---|---|---|
| 1,180,403 | Leblanc | Apr. 25, 1916 |
| 2,068,878 | Suczek | Jan. 26, 1937 |
| 2,390,506 | Buchi | Dec. 11, 1945 |

FOREIGN PATENTS

| | | |
|---|---|---|
| 20,603 | Great Britain | Nov. 26, 1891 |
| 348,909 | Great Britain | May 21, 1931 |
| 456,989 | Great Britain | Sept. 16, 1936 |
| 463,566 | Great Britain | Apr. 2, 1937 |
| 571,297 | France | Jan. 31, 1924 |
| 46,393 | France | Mar. 24, 1936 |

(Addition to No. 710,779)